United States Patent
Baker, Jr. et al.

[11] Patent Number: 6,160,336
[45] Date of Patent: Dec. 12, 2000

[54] PEAK POWER ENERGY STORAGE DEVICE AND GRAVITATIONAL WAVE GENERATOR

[76] Inventors: Robert M. L. Baker, Jr., 8123 Tuscany Ave., Playa del Rey, Calif. 90293; Frederick W. Noble, 125 E. Tahquitz Canyon Way, Palm Springs, Calif. 92262

[21] Appl. No.: 09/443,527

[22] Filed: Nov. 19, 1999

[51] Int. Cl.$^7$ .......................... H02H 15/00; F16C 15/00
[52] U.S. Cl. .............................. 310/74; 74/572; 310/156; 290/55
[58] Field of Search ........................... 310/74, 156, 154; 74/572; 73/382; 290/44, 54, 55

[56] References Cited

U.S. PATENT DOCUMENTS

| | | | |
|---|---|---|---|
| 2,719,944 | 10/1955 | Brailsford | 318/254 |
| 2,814,769 | 11/1957 | Williams | 318/171 |
| 3,612,630 | 10/1971 | Rosensweig | 308/10 |
| 3,667,019 | 5/1972 | Elliott et al. | 318/254 |
| 3,903,463 | 9/1975 | Kanamori | 318/138 |
| 3,959,700 | 5/1976 | Sugiura et al. | 318/138 |
| 4,035,658 | 7/1977 | Diggs | 290/55 |
| 4,052,134 | 10/1977 | Rumsey | 416/119 |
| 4,086,505 | 4/1978 | McDonald | 310/74 |
| 4,546,264 | 10/1985 | Pinson | 290/54 |
| 5,398,571 | 3/1995 | Lewis | 74/572 |
| 5,446,018 | 8/1995 | Takahata et al. | 310/90.5 |
| 5,514,923 | 5/1996 | Gossler et al. | 310/74 |
| 5,646,728 | 7/1997 | Coutsomitros | 356/352 |
| 5,721,461 | 2/1998 | Taylor | 310/268 |
| 5,831,362 | 11/1998 | Chu et al. | 310/90.5 |
| 5,929,579 | 7/1999 | Hsu | 318/439 |

FOREIGN PATENT DOCUMENTS 1333343  10/1973  United Kingdom ............. B01D 3/06

OTHER PUBLICATIONS

J. Weber, "Gravitational Waves" in *Gravitation and Relativity*, Chapter 5, pp. 90–105 (W.A. Benjamin, Inc., New York, 1964).

J. Weber, "Detection and Generation of Gravitational Waves", *Physical Review*, (1960) vol. 117, No. 1, pp. 306–313.

J. Weber, "Gravitational Radiation from the Pulsars", *Physical Review Letters*, (1968) vol. 21, No. 6, pp. 395–396.

Robert L. Forward and Larry R. Miller "Generation and Detection of Dynamic Gravitational–Gradient Fields", Hughes Research Laboratories, Aug. 5, 1966, pp. 512–518.

*Primary Examiner*—Nestor Ramirez
*Assistant Examiner*—B Mullins
*Attorney, Agent, or Firm*—Christie, Parker & Hale, LLP

[57] ABSTRACT

An energy storage device comprising a large scale flywheel supported by a fluid bearing. The energy storage device is a very large scale structure having a flywheel of a diameter greater than 100 feet and a concrete steel reinforced rim weighing in excess of 1000 metric tons. In off peak periods the apparatus is operated as a motor with energy input causing the rim to rotate up to a predetermined speed and to maintain rotation at that speed in the power take off mode during peak power time periods, the operation of the electrical circuitry is reversed and the flywheel generates electrical energy which is delivered by the storage device to the power grid. As energy is delivered the rotational speed of the flywheel diminishes and gravitational waves capable of being shaped and modulated are generated. Likewise as energy is added to the device the rotational speed of the flywheel increases and again gravitational waves capable of being shaped and modulated are generated. Such gravitational waves can be utilized for communication, propulsion and for the purpose of testing new physical theories, concepts, and conjectures. A unique electrical circuit utilizing coils and power transistors under computer software control facilitates the functioning of the apparatus as a peak power energy storage device, as an energy supply device obtaining energy directly from the wind or as a gravitational-wave generating device.

44 Claims, 18 Drawing Sheets

PEAK POWER ENERGY STORAGE DEVICE AND GRAVITATIONAL WAVE GENERATOR

BACKGROUND OF THE INVENTION

This invention relates to peak power storage devices for providing additional electric energy during peak power demand periods. More particularly this invention relates to a large scale flywheel mounted in a water bearing for generating electrical energy during certain intervals and for storing electrical energy in other intervals. Of equal importance, this invention relates to an extremely efficient and novel apparatus for extracting or supplying energy from and to the storage device and for producing continuous gravitational waves that can be modulated and utilized for communication, propulsion and for the purpose of testing new physical theories, concepts, and conjectures.

DESCRIPTION OF THE PRIOR ART

Modern electrical power needs are currently served by a system of fossil fuel, hydroelectric, nuclear, wind energy, geothermal, and solar energy sources In order to satisfy all electrical power requirements and avoid "brown outs", the energy delivery system must be designed and engineered to provide sufficient power for the peak requirements of every network or grid of each of the power delivery subsystems.

The average or normal power needs of each of these subsystems are significantly less than their peak power requirements so that if there were a standby means to store power during off peak times, and then return the power to the power grid during peak demand times, a substantial reduction in the number and size of energy generation plants could be achieved. The cost savings would amount to trillions of dollars world wide.

Currently in the deregulated, market driven scenario, the situation is exemplified by the providers of electrical power charging a much higher rate during peak periods than during off peak periods to discourage the use of power during peak periods and thereby theoretically reduce the demand and hence the need for more electrical generation plants. During peak demand periods, particularly on extremely hot summer days in which air conditioning systems utilize a large amount of power, the demand for electricity soars and likewise the price for power increases dramatically. Sometimes the cost can be as much as 500 to a 1000 times greater than the usual price for reserve power. Such a scenario creates a favorable situation for providing an efficient, low cost device that stores electrical power during off peak periods and returns it, or sells it back, during peak periods.

The requirement for an efficient, low cost electrical energy storage device is not new and various devices have been proposed in the past. Such devices have utilized large banks of batteries, hydrogen generation and storage, high rpm composite flywheels operating in a vacuum and the like, but so far none has proved to be sufficiently efficient. The concept of using a large wheel for storing kinetic energy during one period and then utilizing the stored energy to generate electricity in a different period is already known. A first example is shown in British Patent GB 1,333,343. Disclosed therein is the concept of using kinetic energy to accelerate very large, high weight flywheels mounted in annular recesses excavated in the ground to speed them up during off-peak periods and to drive generators during short peak demand periods.

In the GB'343 patent, the flywheel is a component of an electrical generating plant that is also used to desalinate water. The device has heat exchangers for receiving sea water, a central furnace and pumps to heat sea water and force it through a nozzle where it flashes into steam to drive a pair of Pelton turbine impellers. The turbine rotors in turn are engaged by means of friction or gear teeth with two large annular disks that may be of reinforced concrete. The patent discloses that these disks may be supported for low friction rotation on a cushion of compressed air and act as large flywheels for energy storage in kinetic form. Power take off is accomplished by utilizing surface engaging wheels which transmit the energy in the flywheel to drive alternators and thus deliver electricity.

In another prior art device, U.S. Pat. No. 4,035,658, there is shown therein a wind turbine with a kinetic accumulator. In this apparatus, a wind turbine assembly is supported by a plurality of wheels. Electricity generated by the unit is conducted through a collecting ring at a pivot point down through a riser and thence through an exit cable to an exit power line. A very large heavy disk of reinforced concrete, cast iron or other heavy material is suspended over the riser and is supported by a thrust bearing and a radial bearing. Drive wheels accelerate the flywheel to a high speed during periods where excess energy is generated by the wind turbine. When the wind dies or the energy output of the turbine drops below a threshold value, the flywheel returns its energy to the system to generate electricity by means of the electric wheels. Energy is then delivered to the same exit line until the energy stored in the flywheel is exhausted.

The prior art indicates that fluid bearings are known; for example, such bearings are shown in U.S. Pat. No. 3,612,630.

The prior art also indicates that magnetic bearings are known; for example such bearings are shown in K. Halbach, "Design of Permanent Multipole Magnets with Oriented Rare Earth Cobalt Materials," *Nuclear Instruments and Methods,* 169, pp. 1–10, (1980) and in R. F. Post, T. K. Flower and S. F. Post "A High-Efficiency Electromechanical Battery," *Proceedings of the IEEE,* 87, 300, 462–474 (1993). U.S. Pat. No. 5,398,571 describes a motor/generator system wherein the rotor is positioned externally of the stator with magnetic bearings suspending the rotor at each of its ends. U.S. Pat. No. 5,831,362 discloses a flywheel system for storing kinetic energy using a high temperature superconductor/magnet system for the flywheel bearings. The levitation system includes a magnet for attractively or repulsively interacting between the flywheel magnet and a ring magnet. In order to efficiently extract or supply energy to a flywheel storage device, a system of permanent magnets on the flywheel and coils in close proximity to the flywheel is utilized.

The use of airfoils on the rim of a vertical-axis windmill is also known. U.S. Pat. No. 4,052,134 discloses a vertical-axis wind turbine carrying a plurality of substantially upright vanes spaced a substantial distance from the vertical axis and circumferentially spaced from one another so that wind thrusting propulsively against the vanes impacts a rotation to the wind turbine.

The application of transistors in connection with coils for driving "brushless" commutatorless permanent magnet direct current motors is also known and the first example is U.S. Pat. No. 2,719,944. This patent was granted shortly after the transistor was introduced into common practice and relates to a direct current motor having transistors in field windings which perform the commutating function.

In U.S. Pat. No. 2,814,769 a synchronized electronic oscillator for powering a small alternating current motor includes a battery operated transistor oscillator to power a clock motor. The concept is to produce a constant alternating power, utilizing a synchronizing signal, to operate a small synchronous motor efficiently; that is, it has a low power requirement. Although the transistors are in the same circuit as the coils, the invention is actually an alternating current frequency control device that can be used to power a small synchronous motor.

Permanent magnet motors utilizing transistors, or equivalent switching elements in lieu of a commutator, are shown in U.S. Pat. No. 3,124,733. In the '733 patent a direct current motor exhibiting multiple poles (6 shown on both rotor and stator) whose stator coils are energized using transistor circuits is shown. The polarity of electromagnets comprising the stator can be reversed by energizing coils wound in opposite directions. An object of the invention is to utilize transistors, or other electronic switching elements, to replace a commutator and also to provide transistor-operated direct current motors that may work as either stepping motors or as continuously rotating motors.

In another prior art device, U.S. Pat. No. 3,667,019, there is shown an improved control circuit for adjusting and regulating the speed of a brushless, direct current motor having three "wye" connected armature coils, a bipolar magnetic rotor and a rotatable shaft. The invention accomplishes this by measuring the motor's speed photoelectrically using a Darlington transistor, and then by the reversal of the armature coil's magnetic field, by means of coil-current switching transistors, changes the motor's speed. The current-carrying electrodes of each one of the switching transistors, emitter electrode and the collector electrode, are connected in series with each one of the armature coil's two-way direct current source.

Earlier inventions are improved upon in U.S. Pat. No. 3,903,463. This patent relates to improvement in rotor position sensing and utilizes a transistor circuit including a servo amplifier for self starting the direct current motor and keeping the motor at a constant speed.

Another embellishment of earlier inventions is U.S. Pat. No. 3,959,700, which is a refinement of the current-control transistor circuit for a direct current motor with a view to inexpensive manufacturing. The '700 patent discloses that the windings or coils for each entire arm are switched on or off sequentially as a rotor's magnetic poles moved by them. Two oppositely wound coils on each of the three armature legs are utilized in both the '733 and the '700 patents.

U.S. Pat. No. 4,086,505 is an electrostatic system for efficiently utilizing energy wherein an outside power source is utilized to rotate a flywheel to a predetermined velocity. In this instance, the magnetic fields of the direct current motor or machine are generated and collapsed and re-generated in timed relationship to the rotation of the armatures. The current from slip rings generates the magnetic fields such that the armature is attracted towards the center of the coil whereupon the field collapses and re-generated in an opposite polarity to repel the armature and thereby impart to the rotating flywheel a sufficient force to maintain the flywheel rotation at a selected velocity.

U.S. Pat. No. 4,418,303 discloses an additional refinement for direct current motor control using a plurality of linear amplifiers connected by transistors to each of three stator windings.

The prior art also indicates that permanent magnets imbedded in flywheels in order to cause their rotation is known. C. W. Gabrys in his Ph.D. dissertation at Penn State University, University Park, Pennsylvania, dated May, 1996 entitled "Design, Fabrication, and Testing of Advanced Composite Energy Storage Flywheels," pages 97ff, discusses permanent magnets imbedded in the glass/epoxy core of the flywheel rotor. These permanent magnets interact with a series of optically synchronized electromagnets to serve as a motor/generator.

Although not well known generally, the concept of gravitational waves is extremely well known in the scientific community. Einstein in his General Theory of Relativity predicted gravitational waves. In many ways they are similar to electromagnetic waves e.g., light, radio, microwave, X-rays, etc., that are produced when a charged particle is accelerated (such as an electron moving up-and-down an antenna wire). In fact, gravitational waves occur when mass is accelerated or decelerated. The predicted effect is quite small, but has been confirmed observationally, for example, in the gradual slowing of the rotation of binary pulsar neutron stars. One of the earliest pioneers in gravitational wave research was J. Weber ("Detection and Generation of Gravitational Waves," *Physics Review* 1960, 117, (1) pp. 306–313). One of his associates was Robert L. Forward who worked at the Hughes Aircraft Company Research Laboratories in Malibu, Calif. whose Ph.D. thesis (in 1965) involved the construction of the first bar antenna for the detection of gravitational waves (reported in the open literature in "Generation and Detection at Dynamic Gravitational Wave Fields," with L. R. Miller, *Journal of Applied Physics*, 38, pp. 512–518,1967). This gravitational wave detector is often referred to as the Weber Bar. Such a bar is essentially a large cylinder of aluminum that is super cooled under a vacuum in order to minimize any thermal noise. When a gravitational wave impacts it, the bar begins to vibrate or "ring" very slightly at its fundamental frequency. This ring manifests itself in a very small change in length of the bar that can be sensed, for example, by a laser. By having two bars separated thousands of miles away one can subtract out the earth-based vibrations (e.g., a hurricane coming to rest), and record only the extraterrestrial waves coming from space. In this rudimentary gravitational wave antenna only the total energy of the waves can be determined and the time that they occurred. Thus there is no way to tell from this kind of instrument the energy of each "graviton," or the number of quanta, or the direction they are coming from.

Weber's instrument observed high energies of gravitational waves and prompted other groups to develop similar instruments. Over the years considerable progress has been made in the development of gravitational wave detectors or antenna. Today there are well over a dozen such instruments operating or under construction throughout the world. One example of art related to gravitational-wave detectors is U.S. Pat. No. 5,646,728, which involves a very low amplitude interferometer instrument suitable for detecting gravitational waves. The purpose of all these instruments has been to detect extraterrestrial sources of gravitational radiation. To this date there has been no known development or construction of an actual gravitational wave generator whose "signal" can be received by these gravitational wave detectors.

The prior art indicates that gravitational-wave generators are theorized although not reduced to practice. According to Robert L. Forward, an alternating, rather than a direct or continuous, gravitational-wave generator could be constructed by means of a tube in which very dense Newtonium-127 is caused to move up-and-down the tube at high-speed. However no drawings or other descriptions of the generator are known that are sufficiently specific to enable a person skilled in the art to practice the generator.

SUMMARY OF THE INVENTION

The present invention is a flywheel type of energy storage apparatus having a very high efficiency. The device comprises an extremely large flywheel that "floats" in a "water bearing" and rotates at a relatively low rpm. Because of its extremely large dimensions, namely a flywheel whose rim is one hundred or more feet in diameter, the rim speed of the flywheel is high even though the actual speed in terms of rpm's is relatively low, on the order of 25 rpm or less. The water bearing is essentially a large hub or spindle floating in a basin of liquid such as salt water, whose center of buoyancy is above the spindle's center of gravity in order to assure stability. There is only one moving part and no slip rings or other mechanisms to wear out. The electrical energy input and take off is not mechanical but is accomplished via an electromagnetic field. A strut and guy wire structure connects the rim to the hub.

In one preferred embodiment, it is contemplated that the apparatus of the present invention would be particularly applicable for use in areas with low population density such as desert areas and the like. The significant physical size of the present invention requires substantial amounts of space and the economics of the energy device of the present invention recommends it be utilized in low population areas where land costs are minimal. In certain locations, this has an additional benefit in that the invention lends itself to use with energy derived from windmills. In the last two decades, windmill farms have become an attractive source of alternative energy supply and have assumed a definite place in the overall hierarchy of sources for supplying electrical energy along with such other alternative sources such as geothermal energy and solar energy. The present invention lends itself to a further modification enabling it to utilize wind to add energy. This is accomplished by means of air foils attached to the spindle's rim. Because of the significant size of the invention according to the present invention, the flywheel of the present invention is also capable of generating gravitational waves in the area local to the physical location of the energy storage device having a gravitational energy flux of about 520 watts per square meter, which is orders of magnitude greater than that produced by a hurricane coming to rest, the spin down of a composite flywheel in a vacuum, binary pulsar PSR 1913+16 coalescing measured at the Sun's distance, our Galaxy slowing, or the earth slowing its rotation. The gravitational waves can be generated in beams and utilized as a propulsion and/or communications means.

The foregoing is attained in accordance with one aspect of the present invention through the provision of an energy storage device comprising a receptacle or basin of a predetermined diameter and depth and a flywheel having a central hub floatably disposed within the receptacle or basin. The flywheel has a rim spaced a substantial distance from the hub, and a support structure is mounted on the hub that extends between the hub and the rim to support a substantial amount of weight incorporated in the rim. A series of permanent magnets are located at spaced intervals along the periphery of the rim and a series of electric coils are disposed at spaced intervals adjacent the rim in operative electromagnetic field relationship with the magnets. A power source for supplying energy to the coils is provided and a power take off is also provided for receiving electrical energy from the coils. The coils may or may not have metallic cores to enhance the magnetic field. Computer control means are operatively connected to the power source and power take off for selectively connecting the coils in series and parallel circuit relationships, and in coils of different effective lengths, in response to operation of the device in a generator, motor, free wheeling, rotational rate modulating or dynamically balancing configuration.

BRIEF DESCRIPTION OF THE DRAWINGS

The foregoing features and advantages of the present invention will be more fully understood by reference to the following detailed description of the invention when considered in connection with the accompanying drawings in which:

FIGS. 2 through 7 exhibit an arrangement that is defined as an "individual independently programmable coil system" or IIPCS.

In FIG. 6A the switching pair or element is off and all current through it is blocked. In FIG. 6B the switching element is on and current is allowed to flow from left to right. In FIG. 6C the switching element is also on but current is allowed to flow through it from right to left. The power-transistor circuit or switching elements can be in one of the foregoing three conditions. FIGS. 6A–6C exhibit one of several possible alternative configurations. For example, the power transistors also may be of the PNP type, a combination of both NPN and PNP, an integrated circuit unit, etc. The encircled SPDT switch is symbolic of a miniature transistor circuit (not power transistors) in a very large-scale integrated network of such transistor switches; each addressed (controlled) by a central computer, that is, their condition is software assignable using, for example, a DeviceNet™ protocol.

FIGS. 7A and 7B exhibit the left-most two (i=1 and 2), FIGS. 7C and FIG. 7D, the second two (i=3 and 4), FIG. 7E and FIG. 7F the third two (i=5 and 6) and FIGS. 7G and 7H the last two coil sets (i=7 and 8) in the 8-coil-set row. The diamond-shaped blocks in FIGS. 7A through 7H identify the particular power transistor of interest by means of a number. For example, 1.1d, FIG. 7A 13, identifies the first coil's (i=1) first transistor with the current directed downward if it is on.

Figure 7A:
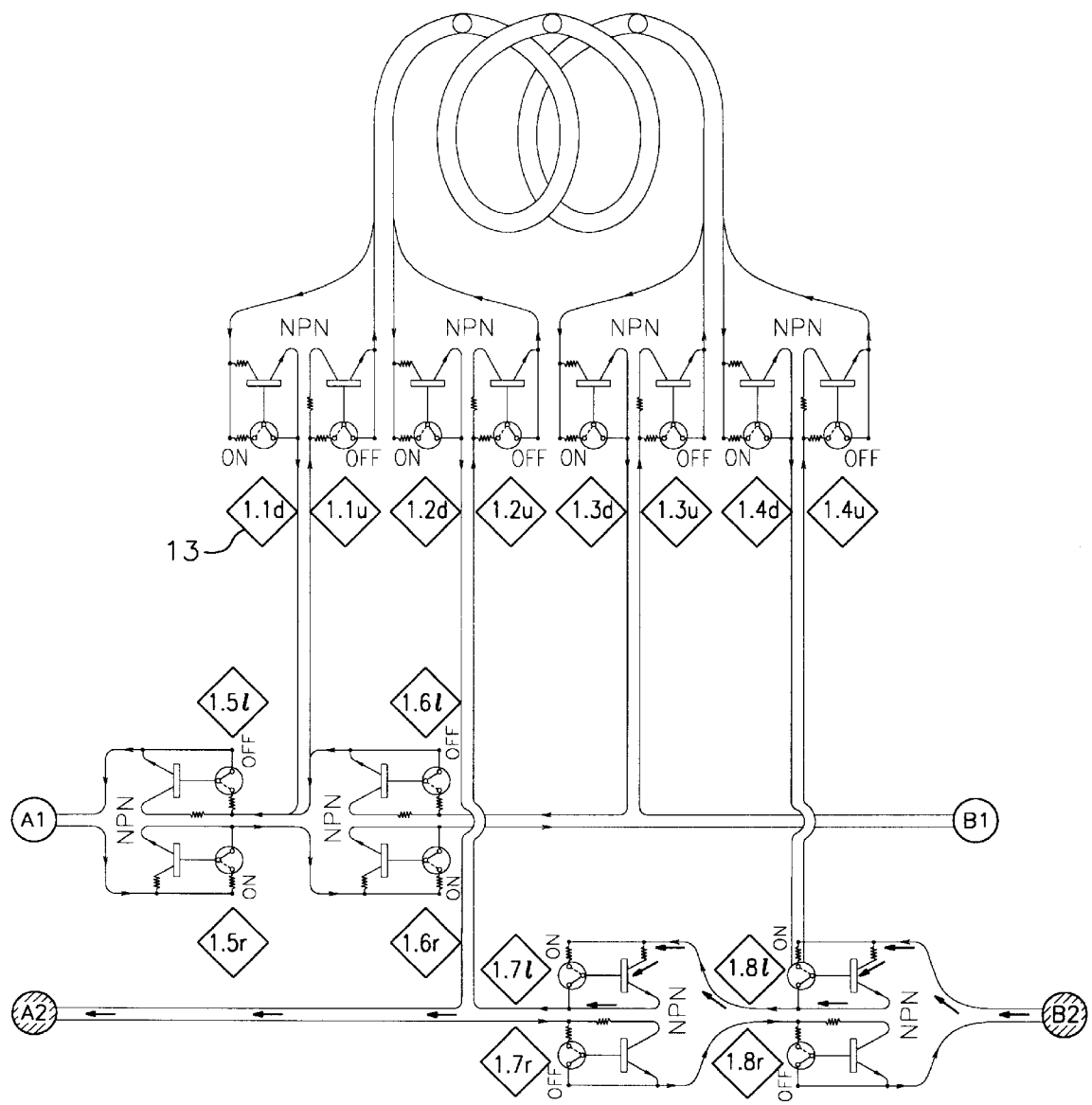
FIGS. 7A, 7B, 7C, 7D, 7E, 7F, 7G and 7H depict sections of 8 coil sets (i=1 to 8) in a row that are passed over by the permanent-magnet poles as the rim rotates over them.
Figure 7B:
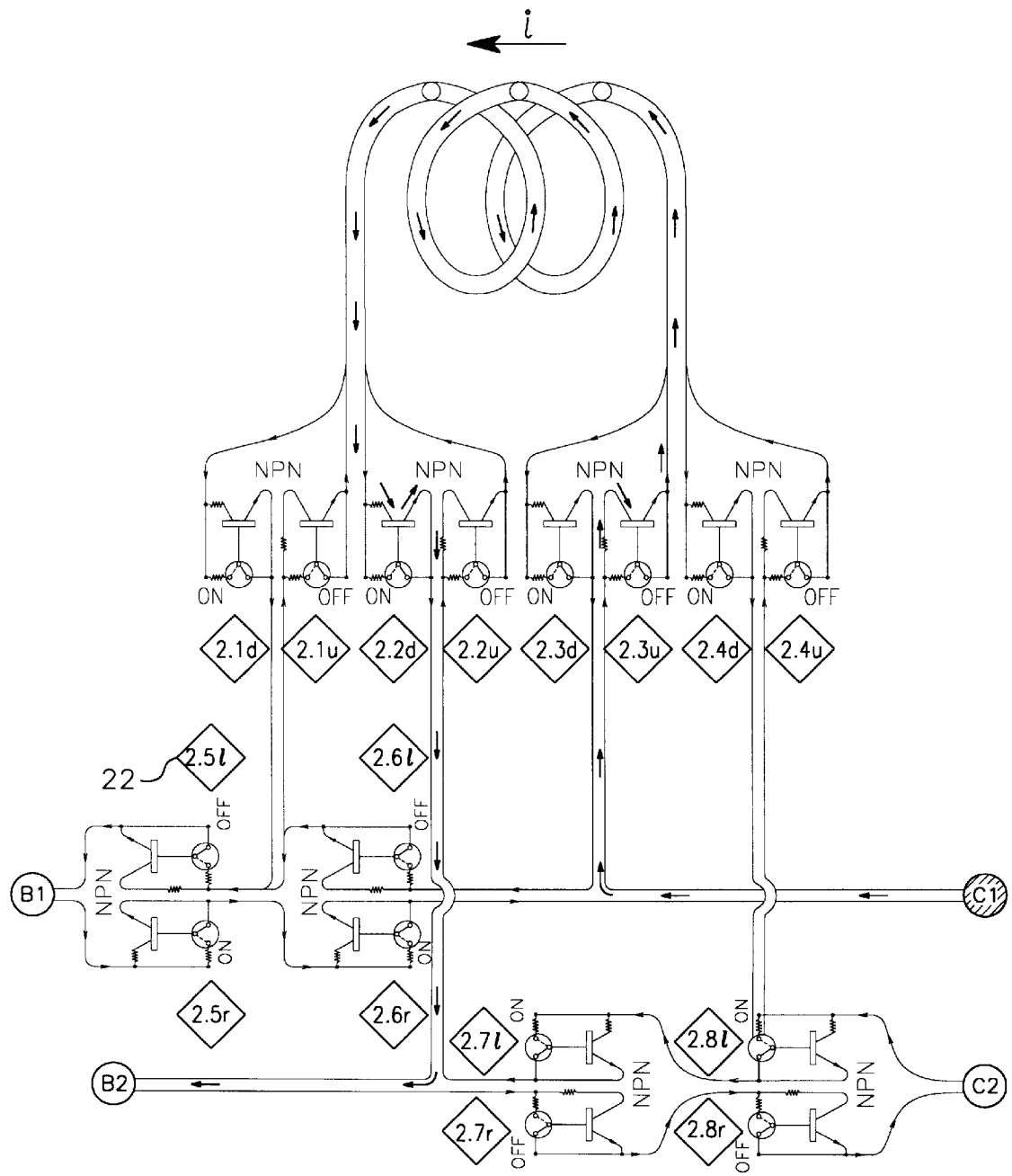
Figure 7C:
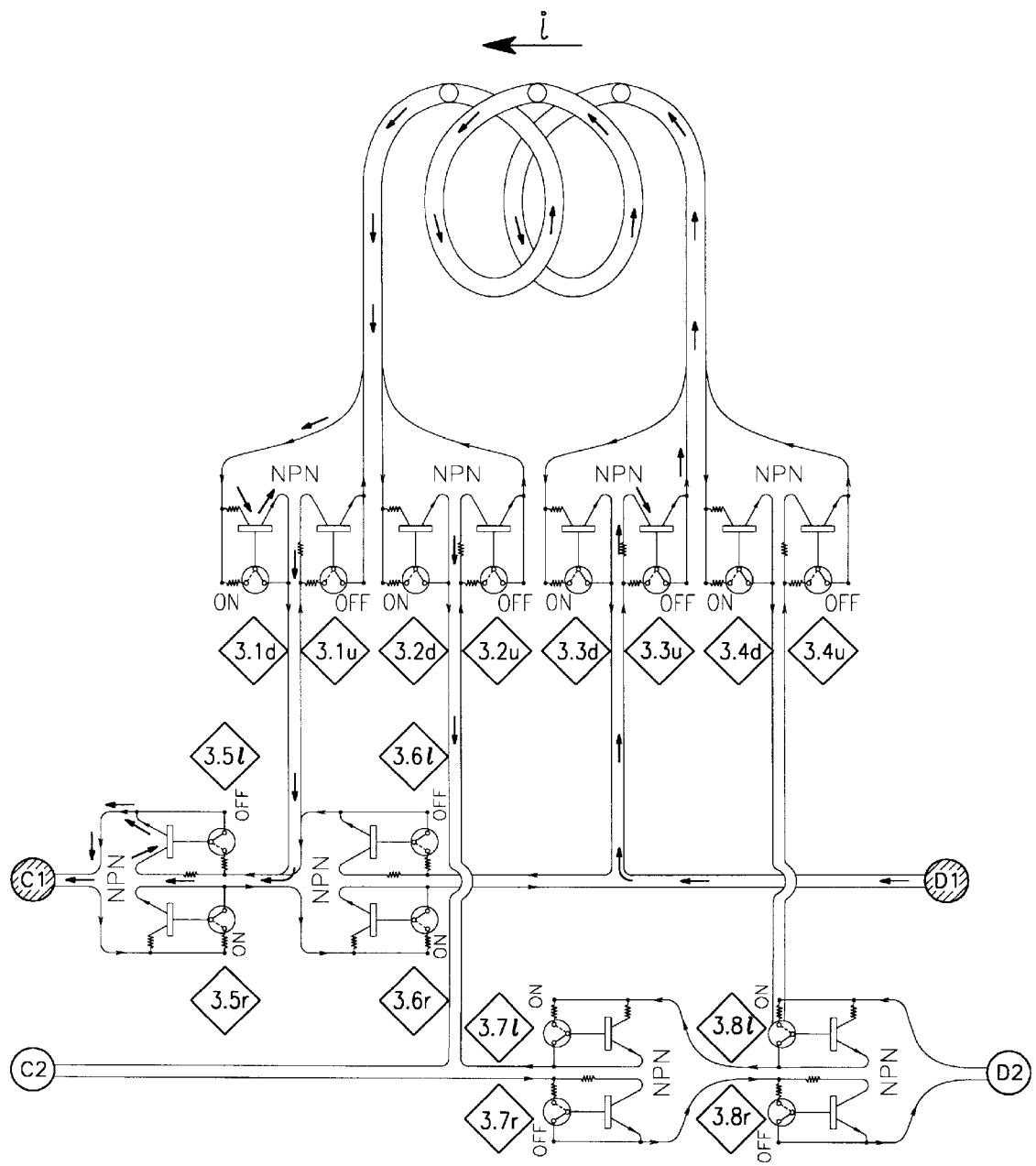
Figure 7D:
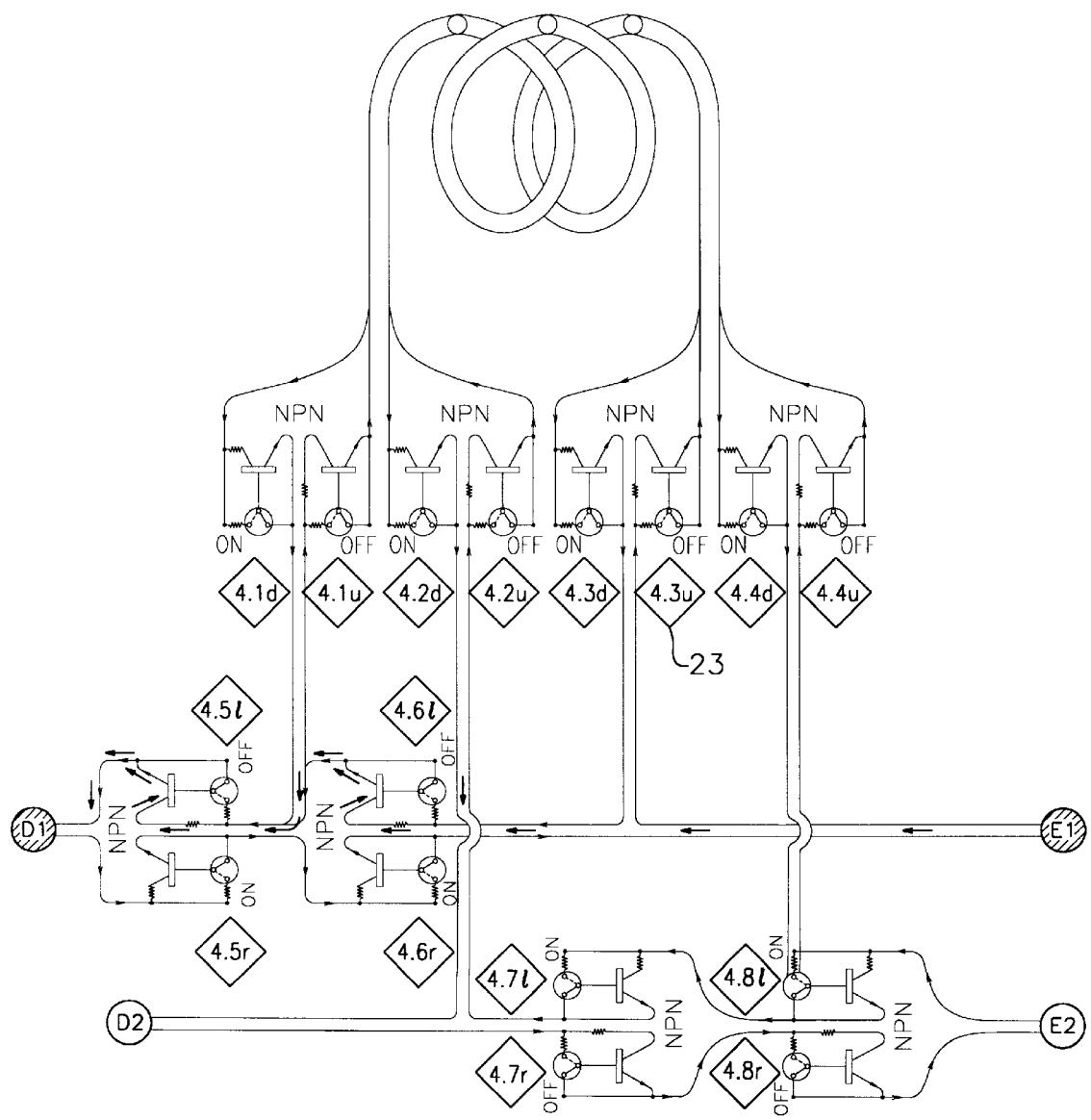
Figure 7E:
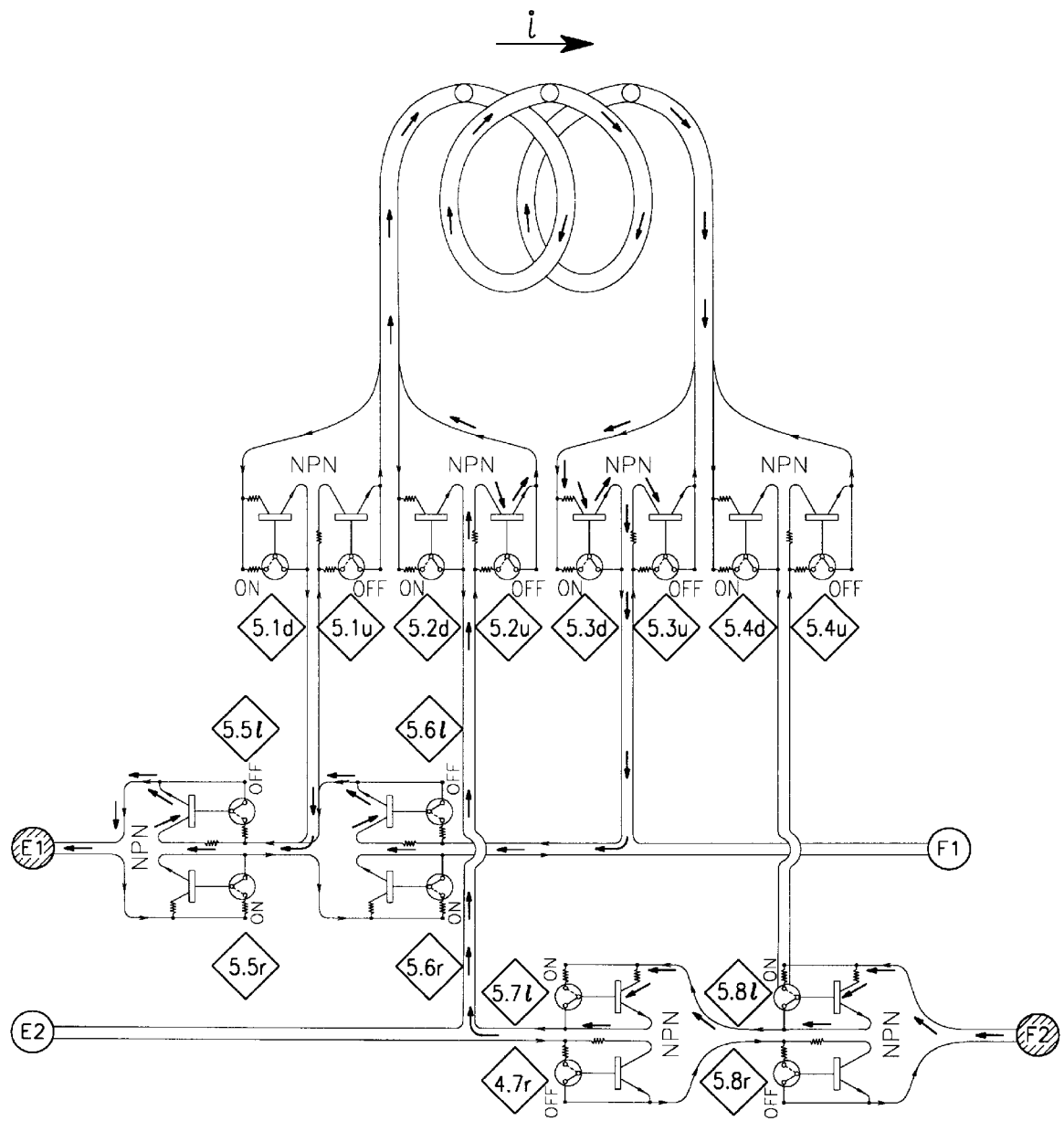
Figure 7F:
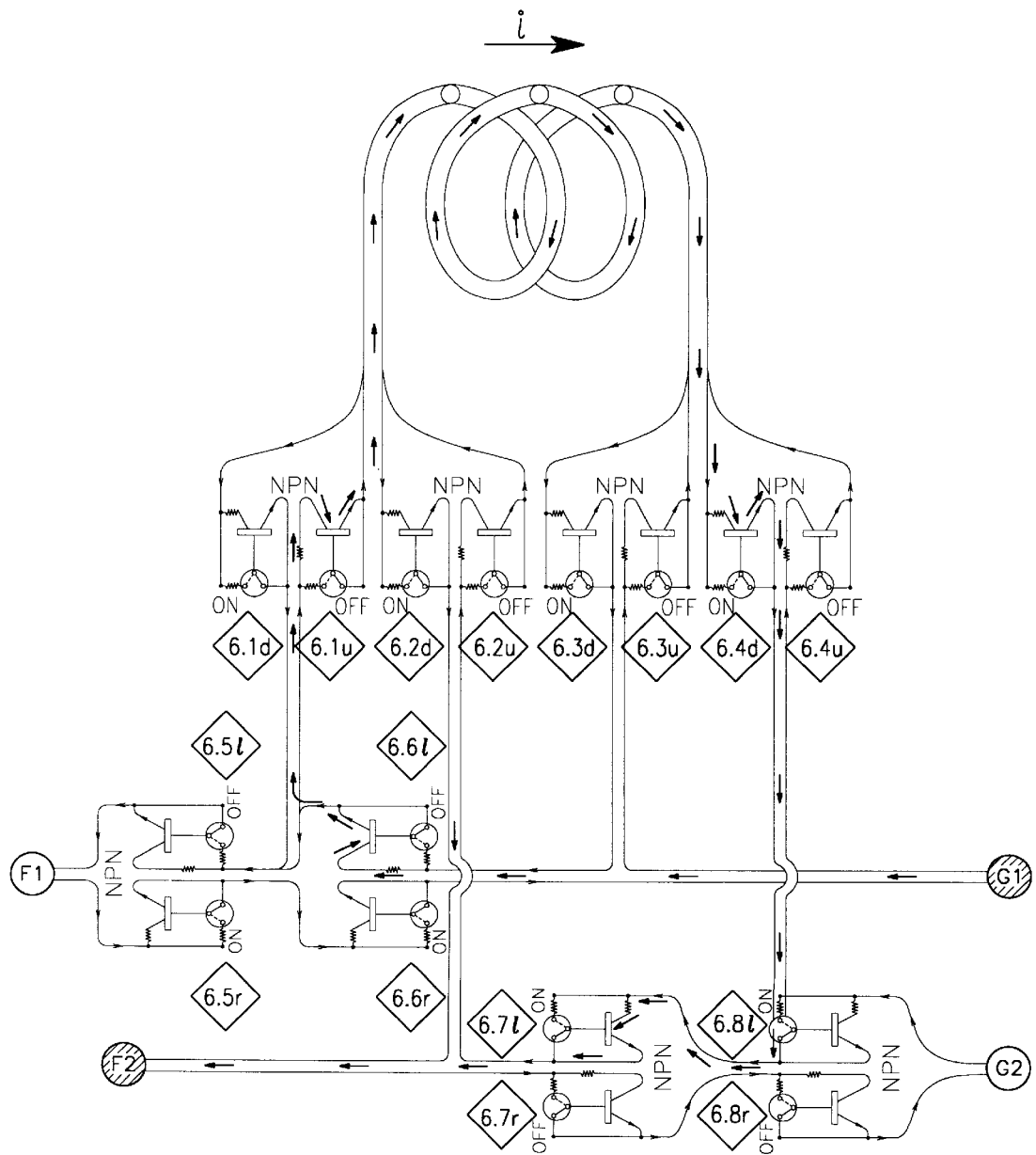
Figure 7G:
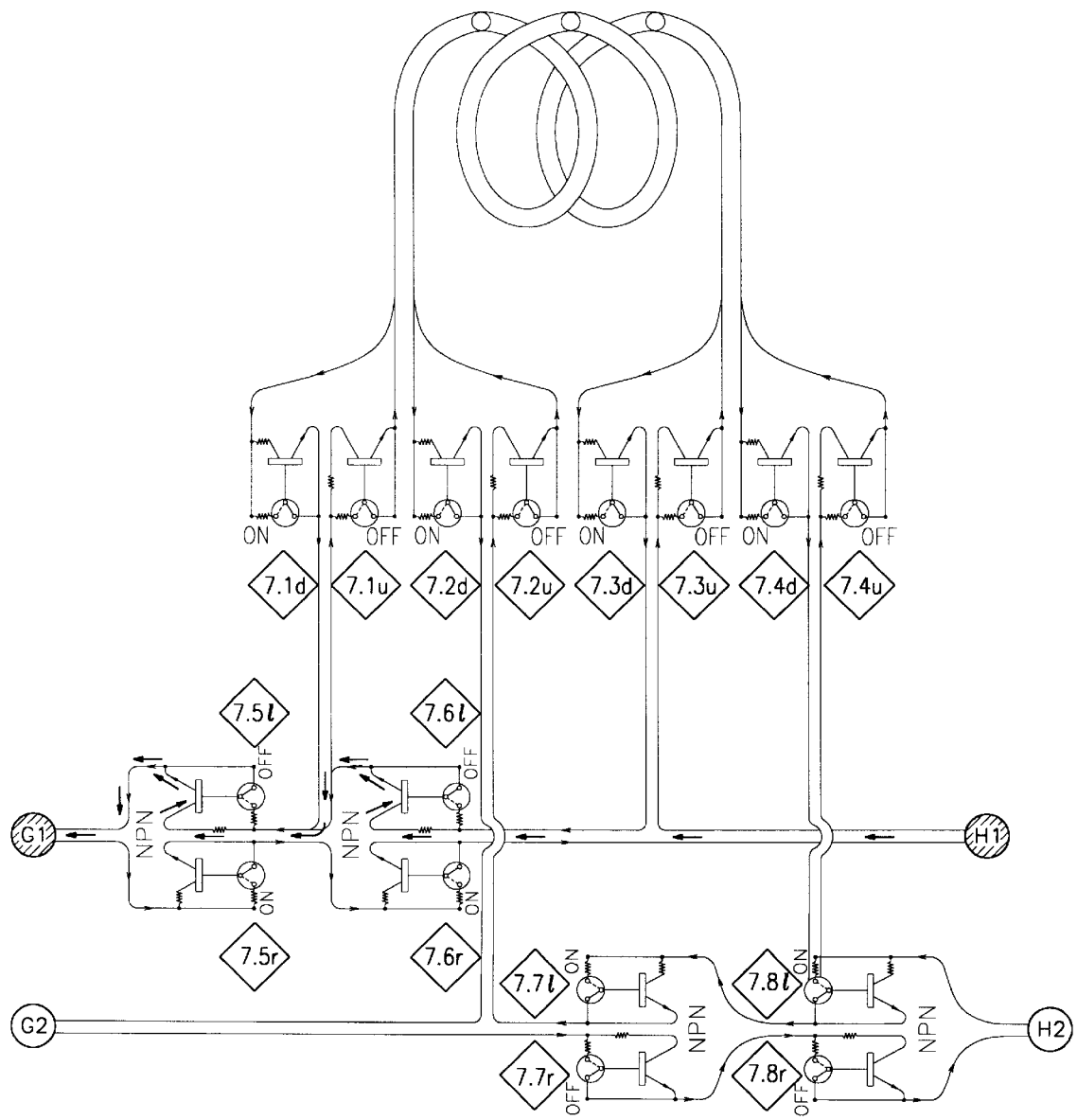

The number 2.51, FIG. 7B 22, identifies the second coil's (i=2) fifth transistor with the current directed to the left if it is on. The number 4.3u, FIG. 7D 23, identifies the fourth coil's (i=4) third transistor with the current directed upward if it is on. The number 5.8, FIG. 7E 25, identifies the fifth coil's (i=5) eighth transistor with the current directed to the right if it is on and so forth.

Figure 8A:
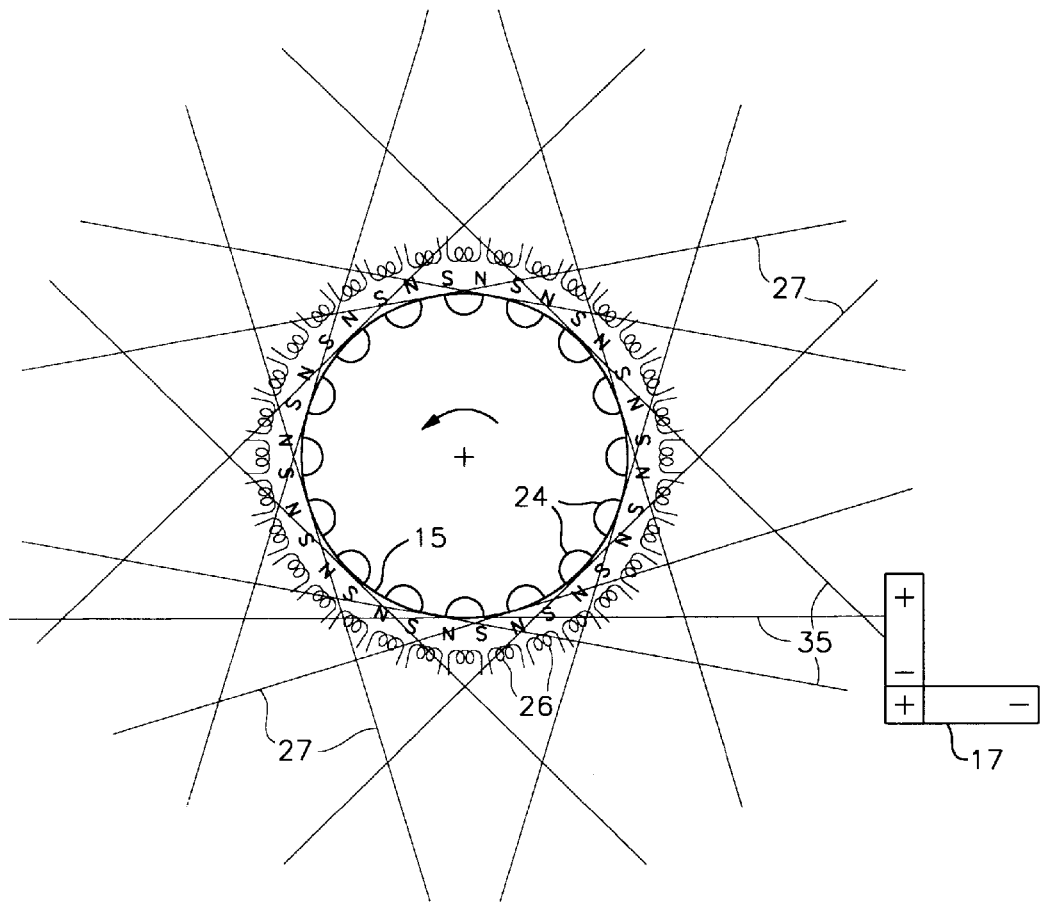
FIG. 8A is a schematic of a spindle/IIPCS gravitation-wave generator device communicating with a gravitational-wave detector by means of modulated gravitational waves.
Figure 8B:
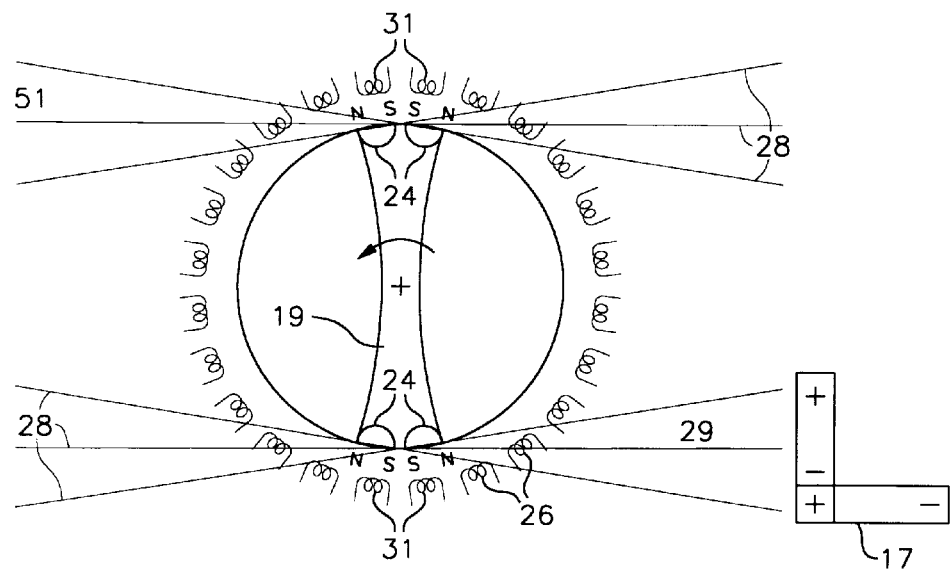
FIG. 8B is similar to FIG. 8A wherein the rim of the spindle is not entirely filled with ballast and it is in the form of a dumbbell.

In FIG. 8B, the gravitation waves are not isotropic as in FIG. 8A, but anisotropic 28 and form a beam or fan 29 when the appropriate coils of the IIPCS 31 are energized as the dumbbell 19 passes over them and there is localized spin up or spin down of the dumbbell. This embodiment of the invention produces a higher "gain" gravitational-wave generator or transmitter. There is, of course, an opposing leg of the gravitational radiation pattern 51. There exist several types of gravitational-wave detectors shown symbolically in FIG. 8; namely the Laser Interferometer Gravitational-Wave Observatory (LIGO) at the California Institute of Technology (supported by the National Science Foundation); A Louisiana Low-Temperature Experiment and Gravitational-Wave Observatory (ALLEGRO) at Louisiana State University referred to in N. Mavalvala, et al (1998), "Experimental Test of an Alignment-sensing Scheme for a Gravitational-wave Interferometer" *Applied Optics,* 37, pp. 7743–7746; An Ultracryogenic Gravitational Waves Detector (AURIGA) at the Laboratori Nazionali di Leguaro referred to in S. Vitale et al. (1997) "Gravitation Antennas" *Physical Review Letters,* 55, pp.1741ff; the EXPLORER detector at the University of Rome, Italy; and several others.

DETAILED DESCRIPTION OF THE PREFERRED EMBODIMENTS

Figure 1A:
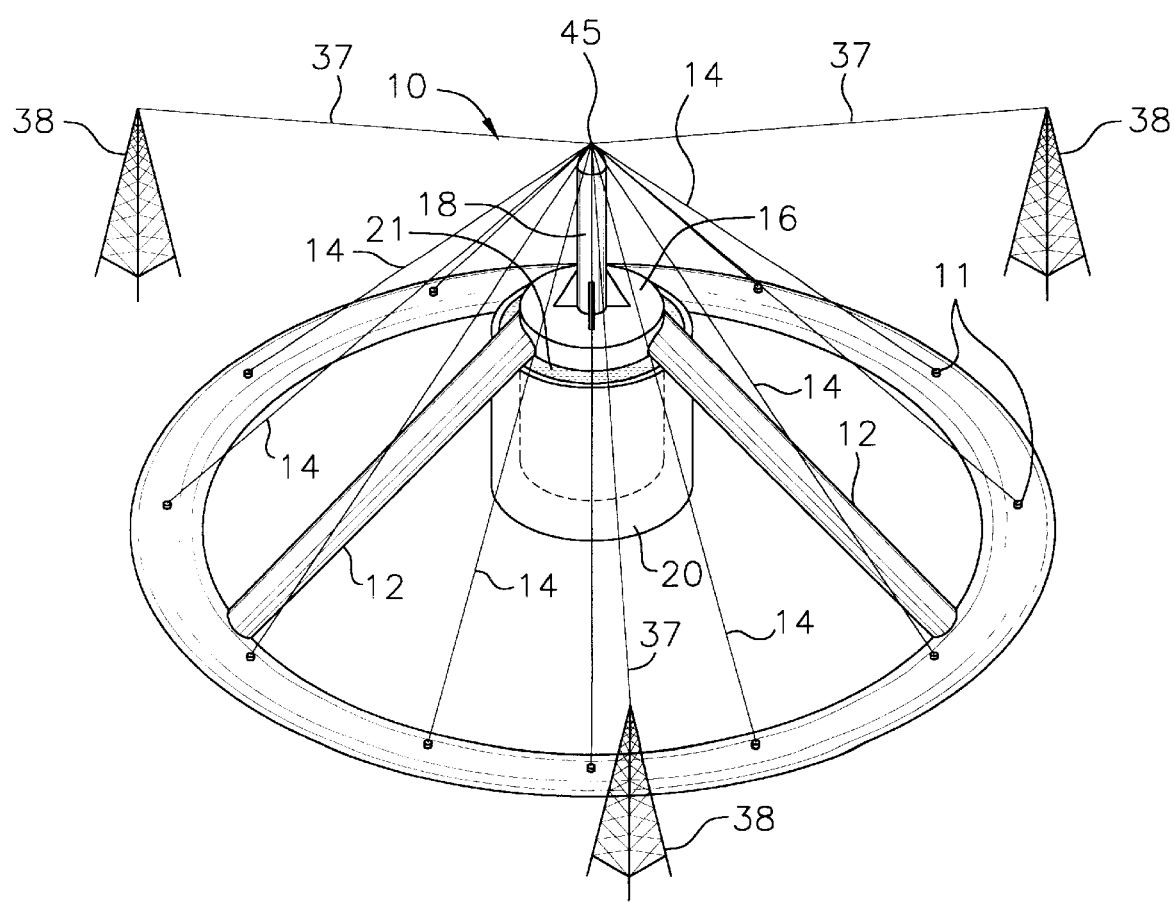
FIG. 1A is perspective view of a flywheel peak power energy storage and gravitational wave generator device of the present invention.
Figure 1B:
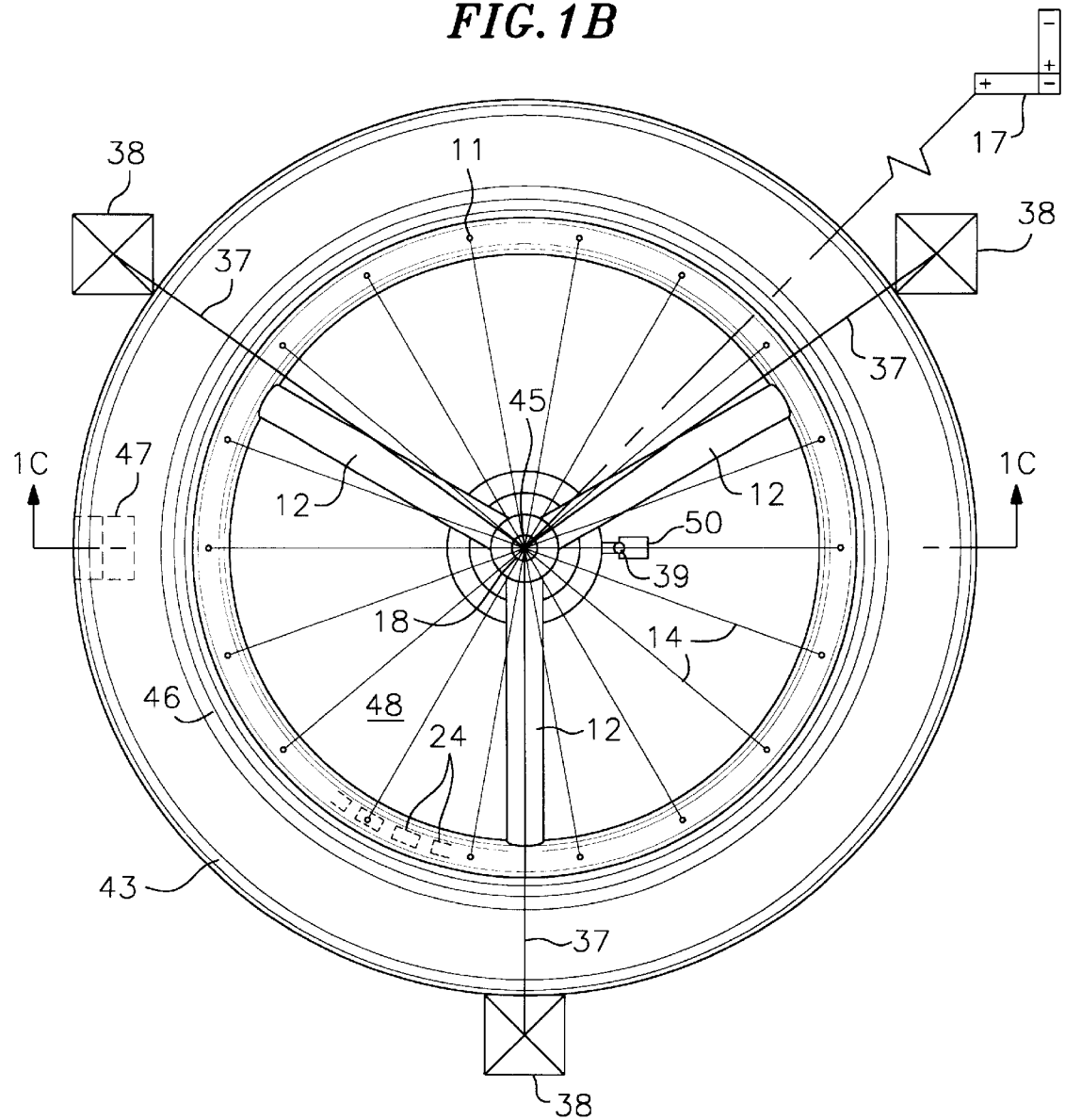
FIG. 1B is a plan view thereof.
Figure 1C:
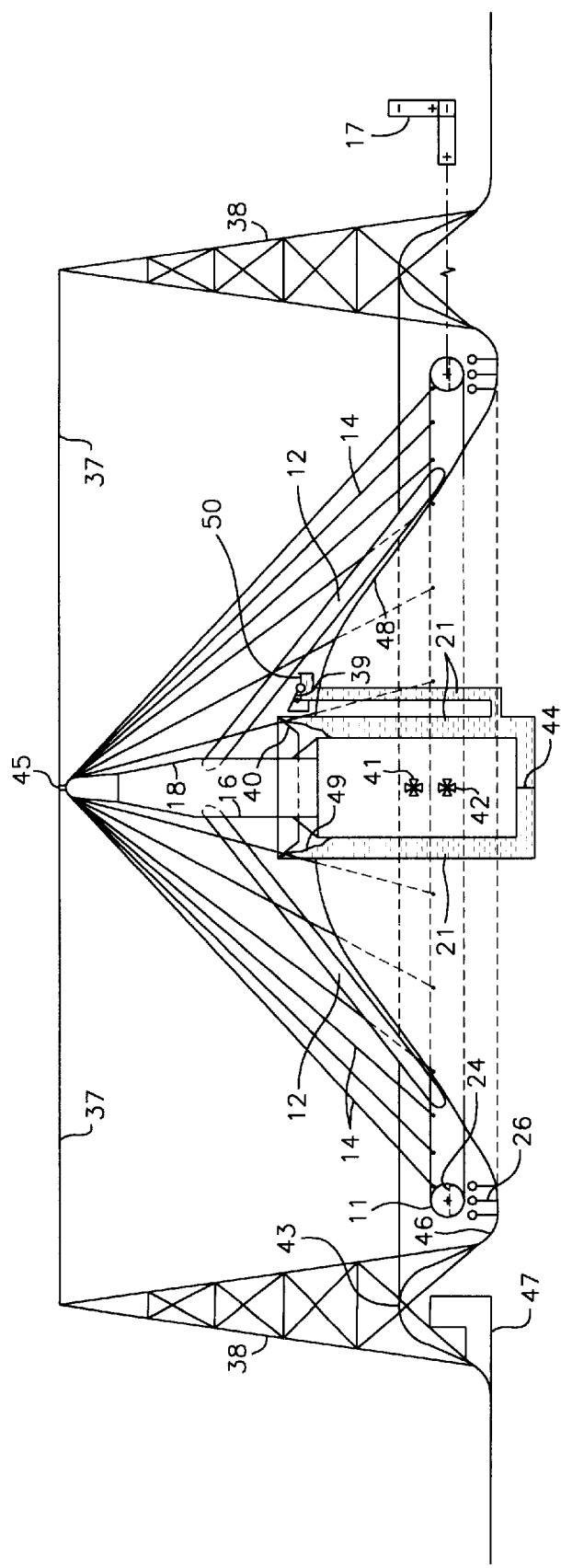
FIG. 1C is a cross-sectional view of the device/generator taken along lines 1C—1C of FIG. 1B.

The energy storage device 10 according to the present invention is illustrated in the perspective view in FIG. 1A, the plan view in FIG. 1B and the cross-sectional view in FIG. 1C. It comprises a circular rim 11, which is supported by struts 12 and guy wires 14. The struts are connected to a hub 16, which supports a spindle 18. The guy wires 14 extend from the top of spindle 18 to spaced locations on rim 11. Likewise, struts 12 extend from the exterior surface of the hub to the interior side of the rim. A large receptacle or basin 20 which is filled with a liquid 21 such as salt water, supports the hub and spindle in a floating condition thereby supporting the hub spindle and rim assembly by means of a water bearing. A berm 43 on the ground surrounds the rim in order to shield the rim from wind- and sand-storms and to reduce the hazard attendant to a possible rim break-up while rotating. The berm, together with a slope 48 of ground surrounding the receptacle or basin forms a containment channel 46. In order to stop the rim's motion rapidly, in the event of severe earthquakes, loss of bearing liquid, accidents, or for the purpose of generating high-intensity gravitational waves, the channel can be flooded with water and the energy dissipated by the rim as it comes to rest will vaporize some of the water. Since centrifugal force drives some liquid up the wall of the receptacle or basin 49 a splash guard or lip 40 is attached to the top, inner edge or rim of the receptacle or basin in order to retain liquid. A float valve 39 provides liquid on demand to make up for any liquid lost from the receptacle or basin due to evaporation, splash out or leaks in order to maintain the liquid level 50. Upper radial bearing 45 and lower radial bearing 44 provided at each end of the spindle are pin and jewel bearings and resist occasional wind-and sand-storm, minor earthquake, and gyroscopic side forces that may be encountered during operation.

The upper radial bearing 45 is supported by a system of wires 37 and support structures 38. The lower bearing 44 is fixed to the bottom of the receptacle or basin. Both bearings allow for moderate z-directed motion of the spindle device by allowing the pins to slip through the jewel bearings without impediment. Use of a plurality of radial jewel bearings in mutual alignment to a common pin is contemplated in order to counter side forces of various magnitudes. The center of buoyancy 41 of the hub is above the center of mass 42 of the spindle in order to afford hydrostatic balance. A gravitational wave detection facility 47 is placed at a convenient location external to and in the plane of the rim, for example, within the berm 43. A typical gravitational-wave detector 17 is positioned in the plane of the rim and located exteriorly of the rim. As discussed in more detail in conjunction with subsequent figures of the drawing, a series of permanent magnets 24 are imbedded in the interior or under-surface of the rim and a series of coils proximate to the rim 26 are fixed on the ground with or without metallic cores.

In a presently preferred embodiment of the invention, the energy storage device according to the present invention is contemplated to be a circular rim having a diameter of 455 feet. The rim is constructed of steel reinforced concrete and weighs approximately 2500 metric tons. Substitution of non radioactive uranium for concrete is also contemplated by the present invention and such a substitution would increase spindle efficiency by an order of magnitude. Composites such as graphite filaments in place of steel rebar are also contemplated. Under rotation, the flywheel rotates at a speed of approximately 25 rpm, which results in a relatively high rate of speed at any given point on the rim of approximately 390 miles per hour. An energy storage device of this size is capable of storing approximately 8 megawatt hours of electrical energy. If the rim is rapidly stopped in six minutes by means of flooding the containment canal 46, then 2,600 gallons of water is boiled away and turned to steam.

The principles of the present invention are also applicable to energy storage devices of other structural dimensions ranging from large installations as described herein to structures of significantly smaller size.

Figure 1D:
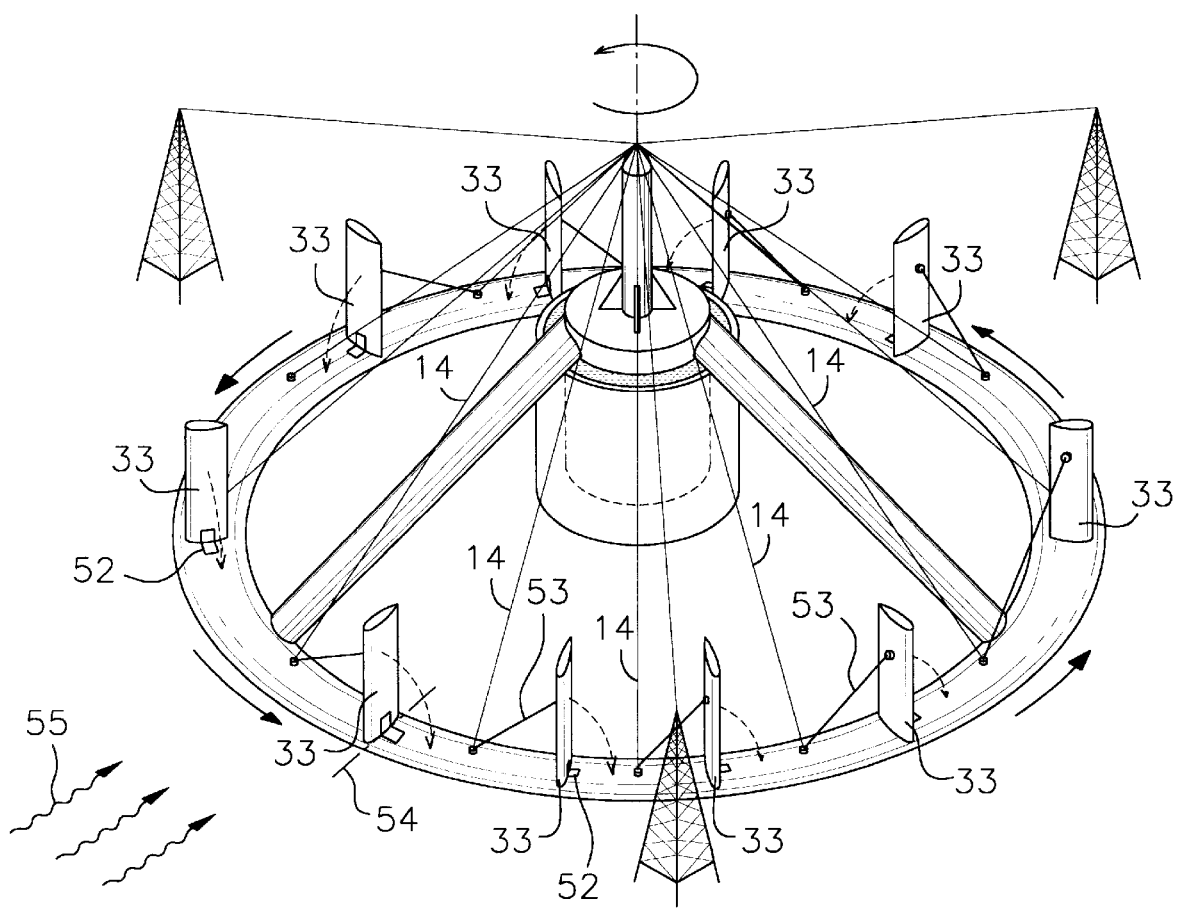
FIG. 1D is a wind driven alternative embodiment of the device according to the present invention.

In the alternate embodiment shown in FIG. 1D, wind-power (rather than electric-motor power input) is utilized to input energy directly into the spindle. This is accomplished by the use of conventional, symmetrical, rigid or flexible airfoils 33 situated around the rim of the spindle. The axis 54 of the retraction hinge 52 on the axis of the curvature of the flex 54 is oriented angularly with respect to the airfoil's chord line and is directed such that the airfoil will recline or tilt when the wind velocities of a predetermined threshold are encountered in order that the top of its span is substantially exterior to the rim so as not to interfere with the rim support guy wires 14 and to increase the moment of inertia of the rim 11 during retraction or tilt and thereby decrease its angular velocity. The elastic tension element 53 extends between a point on the upper portion of the rigid airfoil span, on the side of the airfoil opposite to the direction of the wind thrust, down to the rim and is pre-tensioned so that it will extend when the wind thrust forces are produced by wind velocities 55 that exceed a predetermined threshold. The alternative embodiment of FIG. 1 D can be substantially smaller than the preferred embodiment of FIGS. 1A, 1B, and 1C. The spindle and the airfoils (vanes) operate in the same manner as conventional vertical-axis wind turbines of the carousel variety, except that (1) in very high winds rigid airfoils are designed to fold down in order to avoid damage, (the flexible airfoils bend) (2) the wind turbine has a buoyant, water-bearing suspension, and (3) use is made of non-mechanical transmission and generation of power using the novel IIPCS system according the present invention.

Figure 2:
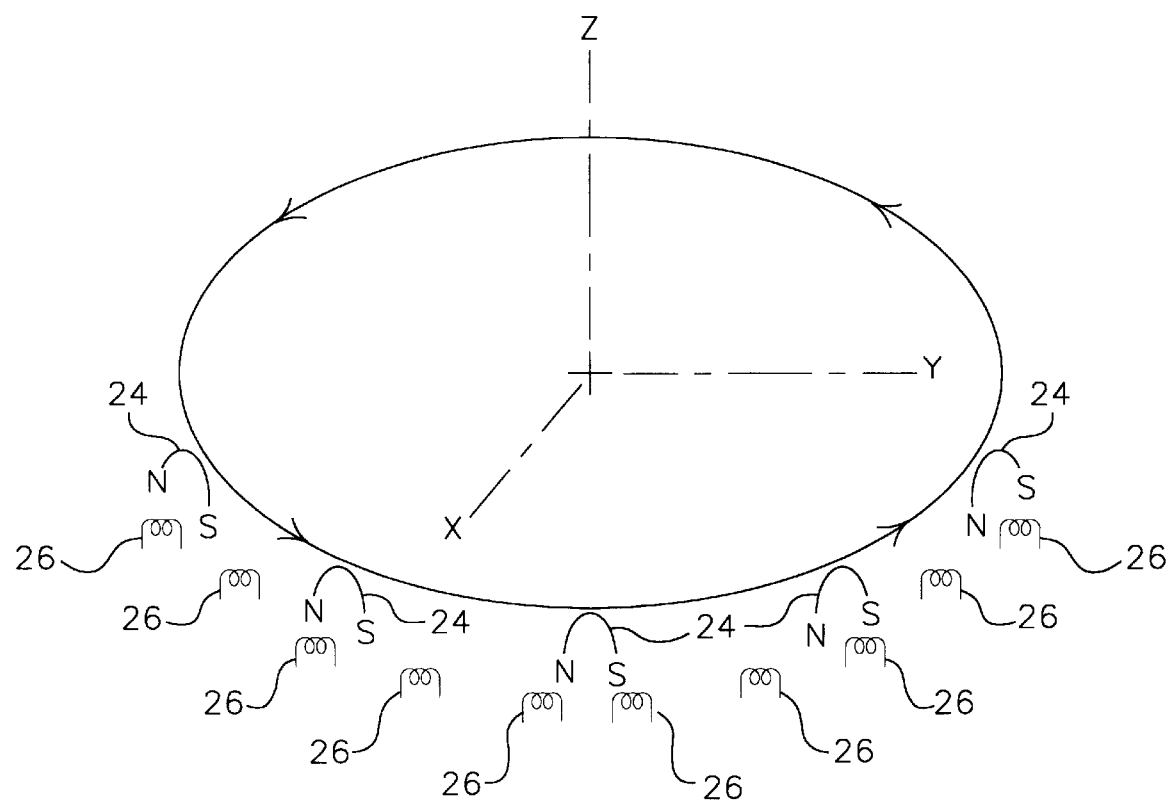
FIG. 2 is a schematic representation of the permanent magnets in the flywheel and the associated electrical coils.

The pivot axis 52 and the axis 54 of the curvature of the flexible airfoil is different from the airfoil's chord line 33 and is directed such that the airfoil will recline or tilt when the wind velocities of a predetermined threshold are encountered in order that the top of its span is substantially exterior to the rim so as not to interfere with the rim support guy wires 14 and to increase the moment of inertia of the rim 11 during retraction or tilt and thereby decrease its angular velocity. The elastic tension element 53 extends between a point on the upper portion of the rigid airfoil span, on the side of the airfoil opposite to the direction of the wind thrust, down to the rim and is pretensioned so that it will extend when the wind thrust forces are produced whenever velocities over a predetermined threshold are encountered. In FIG. 2, a series of permanent magnets 24 are schematically shown that are embedded in the bottom face of the reinforced concrete rim at about 20 ft. intervals. This means that there are approximately 72 large magnets (alternatively a very large number of smaller magnets can be utilized) spaced around the lower surface of the rim. As the spindle turns about the z-axis the magnetic fields of the permanent magnets sweep over a string of individual coil sets 26 that are attached to the ground and located in close proximity to the faces of the permanent magnets. The coils may or may not have metallic cores. In the energy input mode, a current flowing in the coils produces a magnetic field that pulls the permanent magnets in the rim around to the right.

Figure 3A:
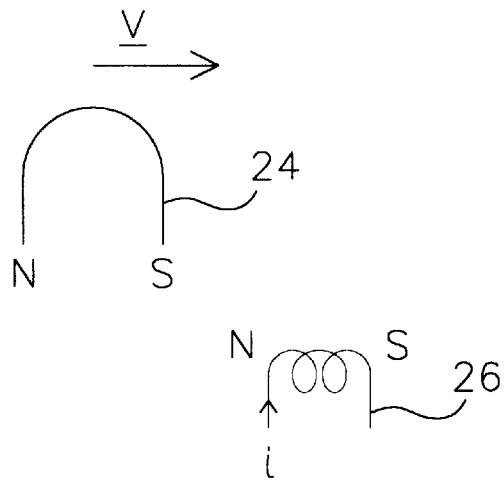
FIGS. 3A, 3B and 3C are schematic representations of the electrical circuitry according to the present invention in the power input, spin up or motor mode.
Figure 3B:
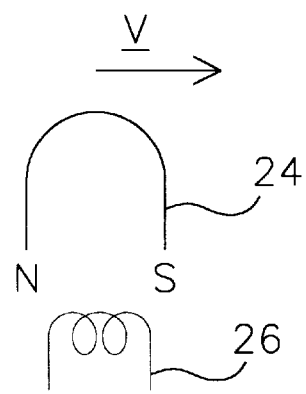
Figure 3C:
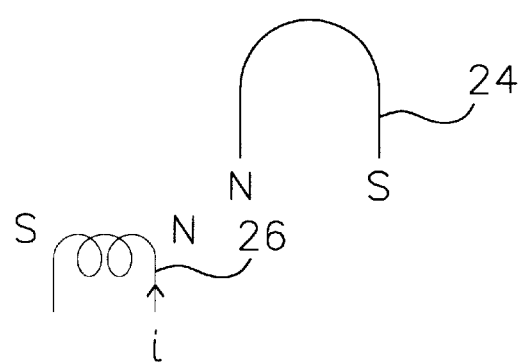

As is shown in FIG. 3A, as a rim magnet approaches a coil set, the south pole of the magnet is attracted by the north pole of the magnetic field produced by current flowing in the coil in the direction shown. Thus, the rim is urged to move more to the right as shown in the drawing and the rim speed increases. In FIG. 3B the permanent magnet has been carried around the rim so as to be directly over the coil and no current flows through the coil as there is no magnetic field in the coil and no force on the magnet. In FIG. 3C, the permanent magnet is receding from the coil and the current has been reversed in the coil, thereby reversing the coil's magnetic field so that the north pole of the permanent magnet is repelled by the north pole of the magnetic field produced by the current in the coil now flowing in the reverse direction. Thus, the permanent magnet and the rim is urged to move even more to the right.

Figure 4A:
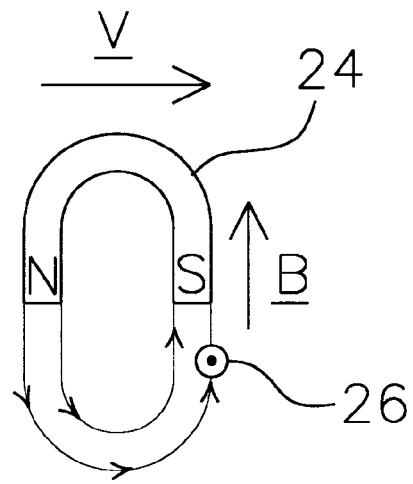
FIGS. 4A, 4B and 4C are schematic representations of the electrical circuitry according to the present invention in the output, spin-down or power-generation mode.
Figure 4B:
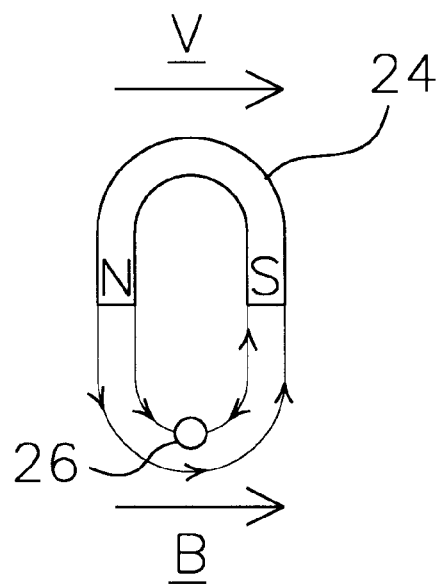
Figure 4C:
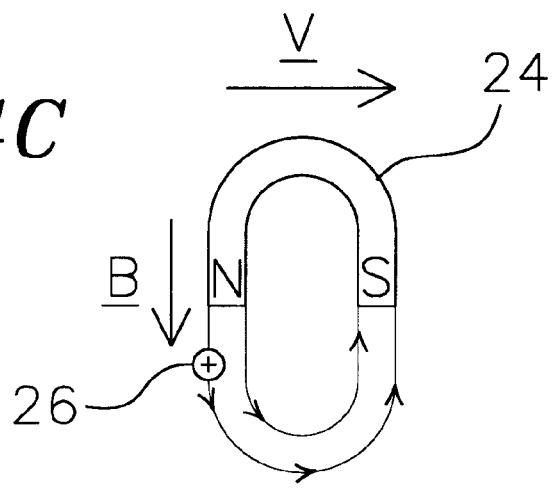

In the electrical energy output or generating mode, the moving magnetic fields result in a current being generated in the coils. As shown in FIG. 4A, the magnet 24 and its associated magnetic field approaches the top of coil 26. The magnetic fields lines B, are approximately u-shaped and flow from the north pole of the magnet to the south pole. Thus, the magnet's south pole, which is approaching the coil, is approximately perpendicular to the face of the pole. As the field cuts across the coil with a velocity, V, a current, i, is created and according to the right hand rule is directed out of the plane of the figure along the axis of the coil loop wire 26. In FIG. 4B the magnet and its field are centered over the coil and the direction of the magnetic field is parallel to the magnet's velocity V, and no current is produced. In FIG. 4C the magnet has moved to the right so that the magnetic field, B, issuing from the north pole of the magnet is approximately perpendicular to its face. As the field cuts across the coil 26, a current, i, is produced that is directed into the plane of the figure opposite to the direction in FIG. 4A. Magnetic flux lines, B, are cut by the bottom of coil loop wire and result in an opposing current in the loop. However, the magnetic flux density at this point is diminished since it is further from the magnet's face than is the top of the coil.

The present invention provides an individual independently programmable coil system (IIPCS) to enable the coils to be electrically reversed in FIGS. 3A and 3C and in FIGS. 4A and 4C. Thus the flywheel-magnet/coil system can be switched between a motor and a generator function at will. Moreover, during the motor or generator function the coils can be reversed in their direction by a power switching transistor every time a permanent magnet passes a coil by using a special purpose control computer. Thus, a current having constant direction can be maintained. Metal coil cores are not desirable if there are significant energy storage times needed between the input and output modes since hysteresis losses or reluctance of the metal core may cause significant resistance to the motion of the permanent magnets. The operation of the individual independently programmable coil system (IIPCS) will be better understood from the following discussion. When the spindle rim is up to speed and is full of energy, its rotational rate is about 24–25 rpm. As it empties or discharges, the rpm drops. For example, after 90% of its energy is transferred, the rotational rate will drop to about 7.6 rpm. If there are 3 individual independently programmable coil sets per foot, there will be 4,290 of such coil sets, each consisting of a plurality of turns. At 24 rpm during each $\frac{1}{60}$th of a second, about 29 coil sets are passed over by the permanent magnets per AC cycle and at 7.6 rpm, about 9 coil sets are passed over per AC cycle. In order to maintain a constant frequency each of the coil sets can be selectively connected by means of 8 power transistor pairs to an adjacent coil set or to one or more conductors or can be totally isolated from the system. In the present embodiment of the spindle device according to the present invention, the voltage would be 12,000 volts and 100 to 1,000 amps would flow through the coil sets composed of 1 to 1,000 coil/transistor sets in series and/or parallel. Due to the large current, high-temperature superconducting materials are contemplated for the coils and/or power transistors.

Figure 5A:
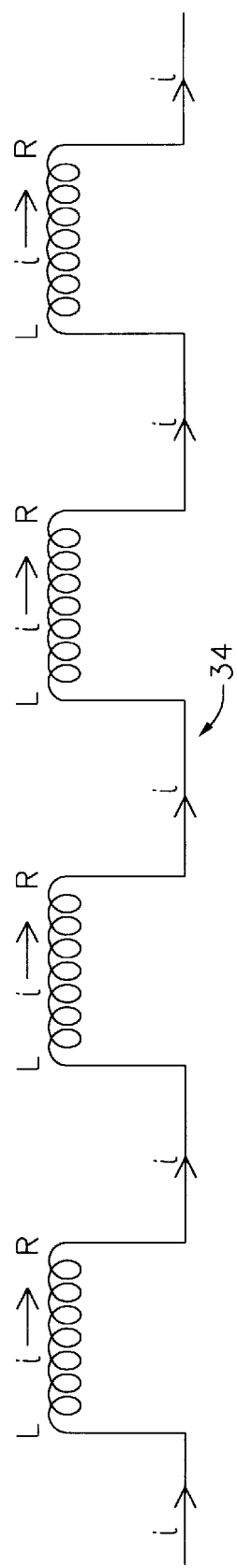
FIGS. 5A and 5B are schematic representations illustrating how the coils of the present invention can be connected to cause current, i, to flow in a direction to the right, R, or to the left, L.
Figure 5B:
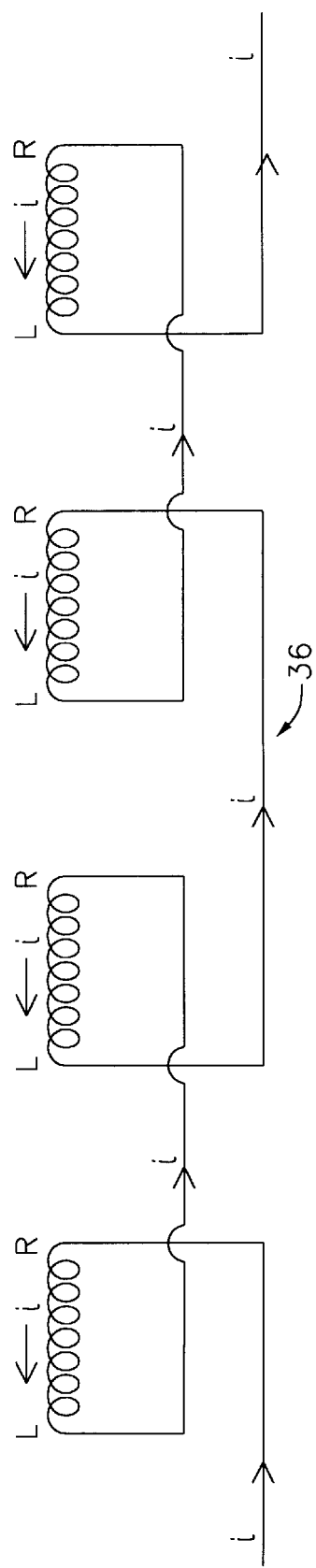

Coils of various lengths can be "assembled" electronically leading or lagging a given permanent magnet or magnets by controlling the power transistors. To accomplish this dynamic assembly, shorter and shorter strings of dynamic coils are connected together in series as the rim slows down more and more. This is done by "breaking" or interrupting a conductor by means of a power transistor before or after a given coil set. Thus, for example, 20 coil sets can be connected in series (coil-to-coil) to a string of 20 more coil sets up the line by breaking the conductor just before the coil in the first 20 coil set string and after the first coil of the next string of 20 coils. The current will run only from the last coil of the first string to the first coil of the next string as shown in FIG. 5B.

Figure 7H:
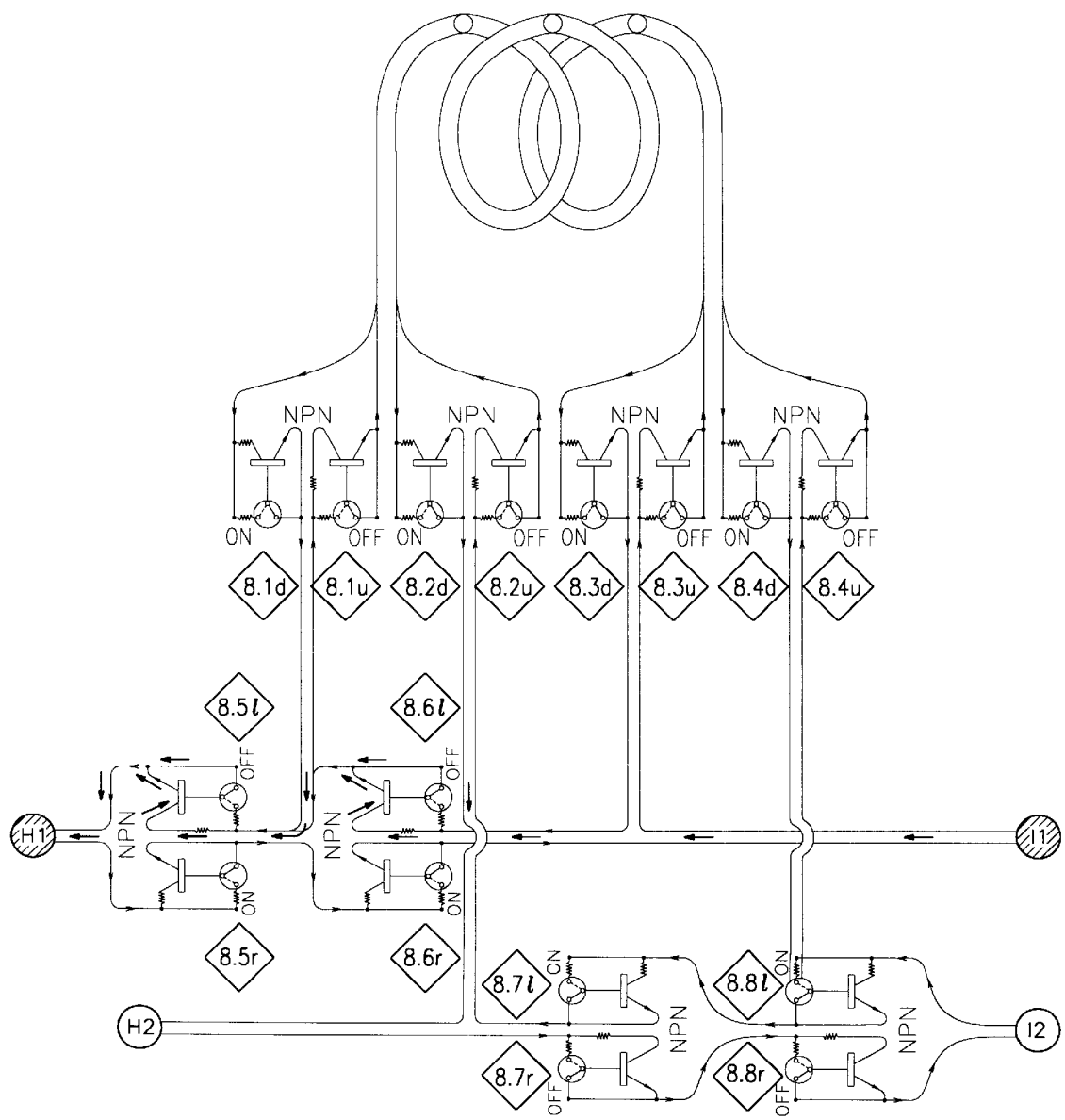

If two conductors are used as shown in FIGS. 7A, through 7H, then a sub group of coils can assembled in parallel by connecting the ends of each coil by means of the power transistors to a different one of the two conductors. These sub groups can be connected in series by the means discussed above i.e., by using the power transistors on the conductors to interrupt or disconnect the conductor just before and just after the sub groups of coils so that the current will only run from the end of the last sub-group to the beginning of the next sub-group of coils and so on up the line on alternate conductors. Since both ends of the coil can be attached to either conductor, the current can flow in either the counter-clockwise (right-hand rule), L to R, direction, FIG. 5A 34 or the clockwise, R to L, direction, FIG. 5B 36, through the coil sets so that the power transistors can be "set by" the control computer almost instantaneously to reverse the coil's magnetic field.

Figure 6C:
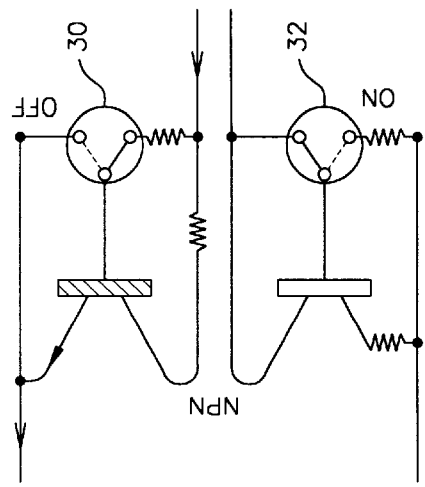
FIGS. 6A, 6B, and 6C are schematic representations of power transistor pairs.
Figure 6B:
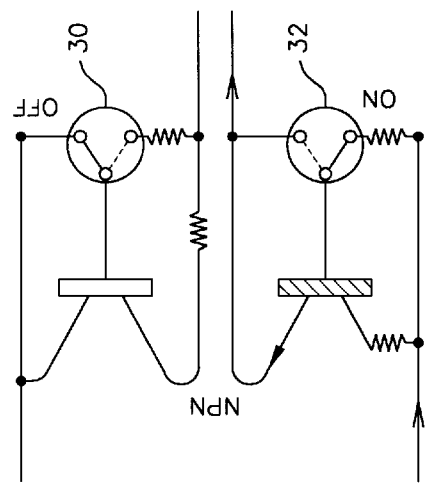
Figure 6A:
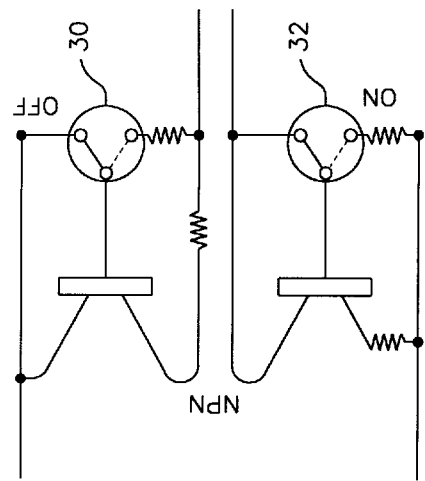

It is also necessary to maintain a constant voltage. To accomplish this the product of the number of coils in series times the ever-decreasing rim speed must be maintained constant during spin down. In performing this task, more coils must be connected in series as the rim speed slows, and this can be done by configuring the coil sets. The coil sets are automatically configured by the computer into parallel or series circuit connections or partially series and partially parallel electrical interconnections in order to "fine tune" the voltage. The coil set itself is a subcircuit having a predetermined number of coils, for example, three, and their associated one or two conductors attached by another pair of power transistors to the main two conductor system. This can be accomplished by a predetermined number of power transistors per coil set. An indexing sensor provides the control computer with information as to the rotational orientation of the rim and its associated magnets. Thus, the coil system is switched by the power transistors 30, 32 in FIG. 6 (four sets at each end of the coil plus four power-transistor sets connected to the adjoining conductor or conductors as shown in, for example, the left coil in FIG. 7A) as directed by the central computer. The apparatus effectively forms coils of different lengths and number of turns at rapidly changing locations around the periphery of the rim in effect, chasing and/or leading the permanent magnets. The computer-controlled distribution of the coils around the rim is random or uniform depending on the user's choice. A nonuniform distribution is utilized to counter spindle unbalance by changing the magnetic coil forces around the rim dynamically as the spindle rotates. The programmable coil system is equally applicable and suitable for use with any variable speed generator, for example, wind turbines or for a variety of electric motor applications and other situations where the speed of the mechanical device is variable.

For the energy storage device of the present invention, the physical relationship of the components of the apparatus make it convenient to arrange the permanent magnets and the coils in a vertical orientation. The permanent magnets are positioned in the rim with the poles of the magnets facing downward. The coils are mounted on the ground below the spindle's rim and as the flywheel rotates and the magnetic flux from the permanent magnets cuts the coils, a current is induced in the generating mode. Similarly, a current supplied to the coils in the off peak periods, immediately prior to peak periods, interacts with the magnetic field of the permanent magnets driving the wheel and gradually increasing its speed up to its optimum rotational speed and maintains it there during the off peak periods until it is returned to the generator mode.

Alternatively, for smaller apparatuses or for other situations there is a different configuration wherein the permanent magnets are mounted as in the spokes of a wheel crossing at a central spindle or center of rotation. Disposed circumferentially around the arc described by the rotating elongated magnets are a series of coils located along radii corresponding to the radii of the elongated magnets. As before, the apparatus can be operated in a) the generator, spin-down or energy output mode, b) the motor spin-up or energy input mode, c) the rotational rate modulation mode, or d) through the use of airfoils mounted on the rim to extract energy directly from the wind.

For purposes of explaining the software controlling the operation of the individual independently programmable coil system (IIPCS) of the present invention, the IIPCS is assumed to be composed of eight coil sets, shown in FIGS. 7A–7H, fixed to the ground in a circle under the rim of the flywheel above which is rotating a single permanent magnet. This configuration can easily be expanded to a much larger number of coil sets under a rim having a large number of permanent magnets attached to it. The magnet's distance along the rim is measured relative to an index or registration mark on the rim, which could be a bar code, and is read during each spindle rotation by a bar-code scanner. Given the relative location of the magnets along the rim, this scan time would, therefore, define the location of any particular magnet. As the leading edge (or South Pole) of the magnet on the rim passes over a given coil set (specifically, it's left end) that coil becomes the index coil. A computer program will modify the transistor circuits comprising the "switches" for the adjacent coils on each side of the index coil depending upon whether the device is in the generator-, motor-, free-wheeling, rotational-rate modulating or dynamically balancing configuration.

The input constants for the program include: the rim rotation direction (counter clockwise or "right-hand rule"), the length between a typical permanent magnet's poles (for example, 1.1 meter), the number of magnets (in this case one), the length of a typical coil set (for example, 0.3 m), and the separation distance between the coil sets (for example, 0.2 meters). Given the number of coil sets, the length of and distance between coil sets, the diameter of the rim can be computed (in this example $8 \times (0.3+0.2)/\pi$ equals 0.6366 meters). The observations include: the first, second, (and subsequent) times that the leading edge (forward or right corner of the South Pole) of the magnet (in this case magnet No. 1, the only magnet) passes the scanner.

The computer program provides a simple linear coordinate transformation that provides the time when the leading edge of a given coil set, "reaches the leading edge" or South Pole of the (single) magnet, given the above-mentioned observations of the first and second times that the leading edge of the magnet passes the scanner (which will define the rim speed). As mentioned above this given coil set becomes the index coil. The location of the scanner is at the left end of coil set No. 1 (the numbering of the coil sets increases in the counter clockwise direction according to the "right-hand rule") and the bar-code will be a fixed to the right corner (or leading edge) of the magnet's South Pole.

Any device such as a scanner, photocell, or any type of sensor that will define the location of the rim at any particular instant of time can be employed. A scanner is preferred because it can pickup the leading edge of each individual magnet and compensate for any measurement error that defines the location of the magnets around the rim. In addition, having such index marks at more frequent intervals around the rim will allow for a more accurate determination of the speed of the rim, V, especially if the rim is speeding up or slowing down. There are a large number of off-the-shelf scanners available. A number of conventional photocell devices that can define a particular location on the spindle's rim at a particular time can also be employed.

Dynamic unbalance is characterized by an out-of-plane-of-rotation (in the z or rotation-axis direction normal to the plane of the spindle/rim as shown in FIG. 2) mass-distribution dissymmetry. For example, a single mass could be located above the plane of rotation (in the +z direction) on the rim and directly opposite it on the rim, an identical mass be located at exactly the same distance below (−z direction) the plane of rotation. Thus the static balance would remain unchanged (that is, as projected on the x- and y-plane of the spindle as shown in FIG. 2, the mass distribution would be symmetrical). The coil configuration utilized to dynamically balance the spindle switches the coil electromagnets in a manner such that they would assume a polarity that attracts or repels the rim magnets in the z direction. This is done in a fashion that compensates for any out-of-plane mass dissymmetry. In its simplest arrangement, the force of the pair of off-plane masses can be exactly counteracted by the electromagnetic force produced by the coil/permanent-magnets under them, which are turned on or energized by the computer-controlled coil-set's transistor-switches as the masses pass over them. The magnitude of the electromagnetic force must be proportional to the z offset and size of the destabilizing masses and will be defined by the computer-control, and current passing through the energized coils. This dynamic balance correction will be superimposed on the generator or motor configuration of the IIPCS or when the spindle is spinning freely and storing energy. There exist a number of means to determine dynamic unbalance and, in particular, a system utilized in balancing wind turbines is suitable. The choice of which coil-set electromagnets to energize is defined in conjunction with the dynamic unbalance determination sensor.

Basically, current is controlled or varied (or corresponded to in the motor configuration) either based upon the duty cycle or amount of time that the coil sets are linked or by the number of parallel coil-set circuits switched on around the rim. In the first case, in order to reduce current, the entire circuit can be disabled by the computer, for example, 25 percent of the time (allowing full current to flow seventy-five percent of the time in a frequency higher or lower (preferably much higher, for example, in the khz or MHz range [to be filtered out later] for a smoother current flow than the rpm of the spindle. To increase current in the second case, the computer switches on more parallel circuits of coil sets around the rim.

Voltage is controlled or varied (or corresponded to in the motor configuration) by the number of coils in the circuit connected in series and their velocity relative to the magnetic fields produced by the permanent magnets. Thus the computer-controlled, transistor switches can add to (or remove from) the full-circuit, selected coil sets by disabling or enabling them (in a uniform pattern) around the circle of coil sets, in response to a slowing down or to a speeding up of the spindle or in response to a need for a greater or lesser voltage.

The voltage of the coil system can be controlled or varied by two means: first, a smaller number of the coil sets, for example, every other coil set, can be energized by the computer-controlled transistors; second, the coil sets can be energized only a fraction of the time that the permanent magnets passes by them (essentially the duty cycle approach noted in connection with current control). It is important to achieve voltage control (and frequency control) as discussed below in order to synchronize the transfer of electrical energy to the commercial power grid. For this it is necessary to keep the product of the number of coils (in series) times the ever-decreasing rim speed a constant.

As previously noted, to accomplish this more coils are connected in series as the rim slows and this can be accomplished by being able to reconfigure the coil sets by computer. Thus the individual independently programmable coil system (IIPCS) can be switched (as has been shown already) by the power transistors as directed by the control computer and the system can effectively "form" coils of different lengths and number of turns at rapidly changing locations around the periphery of the rim, that is, "chasing" and/or "leading" the permanent magnets. More specifically, the power (watts) generated (or used) is given by B (magnetic strength) times the total coil length times the rim speed divided by the load.

Thus, since the product of the length of the coil times the speed is a constant in order to maintain constant voltage, the rate of removal of energy (or its addition) from the spindle, that is the power, will remain a constant (as will the magnetic force). Basically, the total number of coil sets in series placed in service by the computer is directly proportional to the length of the conductor being swept by the magnetic field of the permanent magnets. Since B is a constant and voltage is equal to B times coil length times the rim speed, the product of the number of coils placed in service times the rim speed must remain a constant in order for the voltage to remain a constant.

The frequency of the generated output current (or input current to the motor) is controlled by either of two means: first, by turning all of the computer-controlled coil sets on or off at a periodicity defined by the computer, or second, by periodically reversing all of the current directions by shifting the coil circuits appropriately (using the computer-controlled transistor switches). A more conventional alternating current can be produced during the generator mode by means of the current and voltage control discussed above. In this case, the current flow in or in and out of the coil sets (or the voltage they produce) can be varied as a function of time by the computer in order to produce or conform to, for example, a sinusoidal waveform. This same process changes the rim's rotational rate during spin down and, therefore, modulates and shapes the gravitational waves generated by the device for communications and other purposes.

Voltage and current fluctuations occur as individual magnets pass by individual coils and, particularly, when the index coil shifts from one coil to the next. The problem is somewhat ameliorated by the large number of coil sets that are utilized in any practical application of the present invention. In addition to that the magnetic fields established by the permanent magnets are in a sense "smooth" and the induced currents and voltage do not vary "sharply" that is, with large time derivatives of their values. In any event the voltage and the current can be regulated as discussed above.

Modulation during the motor or spin up mode of operation of the device can be achieved by varying the current or, preferably, the voltage to the coils as the rim passes over them or by the IIPCS in response to a superimposed signal. Thus, the rim speed will be modulated by this signal and thereby modulate the gravitational waves generated during the spin up.

TRUTH TABLES

In order to define the state of each of the eight power-transistor pairs, which control the current flow in each of the coils, by means of the computer software program, it is necessary to construct Truth Tables. There exist four pairs of power transistors leading to the ith coil set as shown in FIGS. 7A, through FIG. 7H (i=1 to 8 for the 8 coil sets) denoted by i.ld, i.lu, i.2d, i.2u, i.3d, i.3u, i.4d, and i.4u, where "u" means upward current flow and "d" means downward current flow. There are also four pairs of power transistors introduced in the upper and lower conduits between the nodes or junctions from the ith coil denoted by i.5l, i.5r, i.6l, i.6r, i.7l, i.7r, i.8l, and i.8r, where "l" means current flow to the left and "r" means current flow to the right. These power transistor pairs for the ith coil will allow for current to flow either up or down or right or left since the power transistors utilized in this example are unidirectional. Three examples of the Truth Table are provided: 1) for the generator configuration with energized coils in series, 2) for the motor configuration with energized coils in series, and 3) for the generator configuration with energized coils in parallel (two of them in parallel on each side of the moving magnet). The switches in question are either on or off. The with coil is the reference or index coil and "moves along" with the magnet's motion at a speed, V, defined by the bar-code scanner. As an example, in the generator configuration having three coils, the left-hand coil is i−4, the index coil is i and the right-hand coil is i+3 (Truth Table 1). As an example in the motor configuration, the left-hand coil is i−5, the index coil is i and the right-hand coil is i+2 (Truth Table 2). For the generator configuration with pairs of coils in parallel, the center coil is just becoming the index coil, i, the left-hand coil is i−5 and the right-hand coil is i+2 (Truth Table 3).

address of a particular power-transistor controller (SPDT) switch is the coil number followed by the power-transistor number (1 through 8), and followed by, for the first group of four power transistors, "d" for down and "u" for up, and for the second group of four, "l" for left and "r" for right.

Attached as an Appendix, is a demonstration program and sample output written in (True) BASIC computer language that will print out the list of power-transistor switch settings each time a new index coil is assigned. The output will be for the first five such new index-coil assignments. The Truth Table (in this example, Truth Table 1) is included as initial input to the program and then "Posted" (in this case, printed)

TRUTH TABLE 1

Generator Configuration, Coils in Series

| Coil Index No. | 1.d 1.u | 2.d 2.u | 3.d 3.u | 4.d 4.u | 5.l 5.r | 6.l 6.r | 7.l 7.r | 8.l 8.4 |
|---|---|---|---|---|---|---|---|---|
| i−3/1 | off off | off off | off off | off off | off off | off off | on off | on off |
| i−2/2 | off off | on off | off on | off off | off off | off off | off off | off off |
| i−1/3 | on off | off off | off on | off off | off off | on off | off off | off off |
| i/4 | off off | off off | off off | off off | on off | on off | off off | off off |
| i+/1/5 | off off | off on | on off | off off | on off | on off | on off | on off |
| i+2/6 | off on | off off | off off | on off | off off | on off | on off | off off |
| i+3/7 | off off | off off | off off | off off | on off | on off | off off | off off |
| i+4/8 | off off | off off | off off | off off | on off | on off | off off | off off |

TRUTH TABLE 2

Motor Configuration, Coils in Series

| Coil Index No. | 1.d 1.u | 2.d 2.u | 3.d 3.u | 4.d 4.u | 5.l 5.r | 6.l 6.r | 7.l 7.r | 8.l 8.4 |
|---|---|---|---|---|---|---|---|---|
| i−4/1 | off off | off off | off off | off off | off on | off on | off off | off off |
| i−3/2 | off off | on off | off on | off off | off on | off on | off on | off on |
| i−2/3 | on off | off off | off off | off on | off off | off on | off on | off off |
| i−1/4 | off off | off off | off off | off off | off on | off on | off off | off off |
| i/5 | off off | off off | off off | off off | off on | off on | off off | off off |
| i+1/6 | off on | off off | on off | off off | off off | off off | off off | off off |
| i+2/7 | off on | off off | off off | on off | off off | off off | off off | off on |
| i+3/8 | off off | off off | off off | off off | off off | off off | off on | off on |

TRUTH TABLE 3

Generator Configuration, Coils in Parallel

| Coil Index No. | 1.d 1.u | 2.d 2.u | 3.d 3.u | 4.d 4.u | 5.l 5.r | 6.l 6.r | 7.l 7.r | 8.l 8.4 |
|---|---|---|---|---|---|---|---|---|
| i−5/1 | off off | off off | off on | on off | off off | off off | on off | off off |
| i−4/2 | on off | off off | off off | off on | on off | on off | off off | off off |
| i−3/3 | on off | off off | off off | off on | off off | off off | on off | on off |
| i−2/4 | off off | off off | off off | off off | off off | off off | on off | on off |
| i−1/5 | off off | off off | off off | off off | off off | off off | on off | on off |
| i/6 | off on | off off | off off | on off | off off | off off | on off | on off |
| i+1/7 | off on | off off | off off | on off | off off | on off | off off | off off |
| i+2/8 | off off | off off | off off | off off | on off | on off | off off | off off |

The object of the computer program is, after computing rim speed by sensing the time (in seconds) of two successive passages of the sensor (for example, the bar-code scanner) by the index coil (for example, the bar-code on the magnet), to keep the list of on power transistor addresses posted for periodic scanning by the Controller Area Network or DeviceNet™. Reference is made to Open DeviceNet™ Vendor Association for details on this standard protocol. The with the coil numbers listed. Whenever a new index coil is assigned after [0.2 m+0.3 m]/V seconds the coil numbers on the left-hand column are advanced by one. If the coil number is greater than 8, then the simplistic demonstration rim has turned full circle and the coil number in question is replaced by the number minus 8. At the fifth index-coil assignment (0,1,2,3,4 so t=4) coil No. 5 has become the index-coil and the situation is as in Truth Table 1 (for example, with input of 10.0, 10.1 seconds: at time 10.15 seconds). Note that for the demonstration model used herein for the concept's description, the face of each permanent magnet is taken to be one coil length in width (for example, 0.3 m) and the distance between magnetic-pole centers to be 3 coil widths plus the coil separation distance (for example, 0.2 meters) or 1.1 m. Other dimensions are, of course, possible and Truth Tables can be developed accordingly.

As a further example of modulation of flywheel's rotational rate by the IIPCS, consider a signal imparted to or expressed by the flywheel spin-up or spin-down rate in the form of the digital or binary message 1001101. Let us utilize a clock rate or cycle rate for the message of one MHz. The procedure will be to introduce a 1 by the ceasing all coil force on the flywheel rim and a 0 by retaining the IIPCS function, uninterrupted, by direction of the computer program in either the spin-up or spin-down mode. Thus the 1001101 message will be imparted to or expressed by the rotational rate by means of a one-microsecond interruption of all coil current, all power transistors off, followed by two microseconds of the usual sequence of the power transistor settings, as for example, shown in the Truth Tables, followed by two microseconds of interruption of all coil current, all power transistors off, followed by one microseconds of the usual sequence of power transistor settings, following by one microseconds of interruption of all coil currents. During each of the one-microsecond cycles, the 4,290 coil sets around the flywheel rim, with the flywheel rotating at 24 rpm, will move $(24/\{60\times1,000,00\})\times4,290$ equals 0.001, 7 or about 0.17 percent of a coil set's length.

The present invention, because of its considerable mass and size and speed, has other applications and capabilities including the generation or production of gravitational waves as previously mentioned.

The concept is that a rotating object such as the spindle-mounted rim device described in the present application generates a gravitational field with a vortex or a twist. The effect is measurable since it affects or warps the spacetime-universe (described herein, a subset of which being the conventional spacetime continuum) geodesic and thereby will produce detectable gravitational waves. That is, the time rate of change of angular momentum of the rim of the spindle device (as it rapidly spins down in the generator mode or spins up in the motor mode) per unit time and per unit area, which is here defined as a "gravitational-energy flux," is a measure of the intensity of the continuous (as opposed to alternating) gravitational radiation that carries off the angular momentum. Reference is made to A. Rizzi (1998), *Physical Review Letters*, 81, No. 6, pp.1150–1153. The following dimensional analysis is revealing: angular momentum, I$\omega$, (I being the moment of inertia [kg-m$^2$] and $\omega$ being the rotational rate [radians/sec] or simply per second) has the units of [kg-m$^2$/sec]. The angular momentum reduction per second has units of [kg-m$^2$/sec$^2$] or Joules in the M. K. S. system. The gravitational "power" is, therefore, Joules produced per second (that is, produced during this spin-down or spin-up time) or watts. The gravitational-energy flux or power, watts per square meter of reference area, which is produced by the spindle, is significantly larger than that produced by other devices and entities. The gravitational energy flux is a measure of the intensity of the gravitational waves produced by the invention. A strongly curved spacetimeuniverse continuum (a subset of which is the conventional spacetime continuim) caused by intense gravitational waves (not as strongly curved as that surrounding neutron stars and black holes, of course) is a valuable environment for many physics experiments. Thus another objective of the present invention is to generate relatively strong gravitational waves, that is, a large gravitational-energy flux [watts/m$^2$], and provide tests of various physical theories, concepts or conjectures such as to test with it some concepts associated with the spacetime-universe geometry and, additionally, to provide tests of a propulsion means for spacecraft operating in the Solar System and means to communicate to gravitational-wave detectors.

The invention also has another objective related to the General Theory of Relativity. In this case a liquid (for example, water) can be frozen (or lead cast) in a toroidal tubular compartment on the rim perimeter while the spindle is rapidly rotating and then when solidified the material will undergo a measurable stress (will ". . . break apart . . . ") as the rim spins down. Reference is made to J. Stachel (1980) and "Einstein and the Rigidly Rotating Disk," in *General Relativity and Gravitation*, A. Held, Plenum Press, New York, pp. 1ff. Thus another objective of the invention used to test this relativistic conclusion directly.

Spacetimeuniverse Geometry

As an example of the utilization of the present invention to test new physical conjectures consider the following: The fundamental cosmological location vector is defined herein by r, t. Where r is a spacial-location vector having the three usual dimensions and 6 or 7(for string theory or M-theory) or more additional curled-up dimensions—a continuum of spatial dimensions in general—all having units of, say, meters. In our day-to-day experience we accept an infinite continuum of successive "current" or "present" times, t, and an infinite continuum of "locations" or "positions" in all of the components of r. It is proposed that we simply extend this acceptance to an infinite continuum in t. And t is the "time" location vector including uniformly increasing, entropy-directed time through the infinite, continuum of universes or the multiuniverse—all having units of say, seconds. Reference is made to the concept of the multiuniverse given in, for example, B. Greene (1999), *the elegant universe*, Norton, N.Y., pp. 367–370, 385, 387.

Underlining the concept of a continuum of dimensions and universes is the fact that the so-called "quantum jitters" and ". . . the roiling frenzy of quantum foam." (ibid pp.129, 151, 175, 337, 381, etc.) are the arch enemy of a digital, discrete, enumeratable and non-continuum universe. Everything is a little fuzzy, not "digital", but rather analog and wavelike especially as one gets to smaller and smaller scales. Such a concept is a natural philosophy or conjecture not a rigorous new physical theory. All universes are not necessarily viable: some may be massless, some may be of no physical significance, and some may have no chance at all to lead to life as we know it. According to this conjecture the "intractable frontier between a smooth spacetime (universe) fabric and apparent, quantum-mechanical 'frenzy' at small scales" (ibid p. 129) is nothing more or less than the interface between osculating universe in which entities shift back and forth at will—actually smooth transitions with mass/energy and momentum conserved and entropy constant. An objective of the invention is to experimentally validate or invalidate the conjecture or concept of this continuum theory of spacetimeuniverse geometry and the attendant possibility of time reversal on very small scales.

The following are some simple algebraic relationships that involve a straightforward reduction of the concept to classical special-relativity equations. Reference is made to R. M. L. Baker, Jr. (1967), *Astrodynamics, Applications and Advanced Topics*, Academic Press, New York pp. 209ff. The position vector is given by $$u=u(r,t)=u(x,vt),$$

where x are the components of r (a continuum of values) and vt are the components of our extended multiuniverse definition of t (also a continuum of values).

In the context of special relativity the spacial-location velocity vector is, $$dr/d\tau,$$

where $\tau$ is the proper time as defined by $$d\tau^2 \equiv dt^2 - dx^2/c^2, \qquad (1)$$

which v=c equals the speed of light.

Rearranging Eq. (1) by dividing by $dt^2$ and multiplying by $c^2$ we have $$c^2(d\tau/dt)^2 = c^2 - (dx/dt)^2, \qquad (2)$$

which shows that an increase in object's speed through position space, $+\sqrt{(dx/dt)^2}$, must be accompanied by a decrease in $d\tau/dt$, or the object's speed through time, or as B. Greene (1999), pp. 391–392 states ". . . the rate at which time lapses on its own (moving) clock, $d\tau$, as compared with that on our stationary clock, dt."

Let us continue with the elementary, special-relativity equations using our extended (continuum) location vector, r, conventions (no motion through t-the fact that legitimatizes ordinary special relativity). Given two inertial coordinate systems $S_1(r)$ or $S_1(x_{11}, x_{12}, x_{13}, x_{14}, \ldots)$ and $S_2$ (r) or $S_2(x_{21}, x_{22}, x_{23}, x_{24}, \ldots)$, in which $S_1$ moves along the $x_{11}$ axes (which for simplicity coincides with the $x_{21}$ axes) at a constant rate, v. At t=0 the points of origin of $S_1$ and $S_2$ coincide. Points at rest relative to $S_1$ will, therefore, move at a speed v relative to $S_2$ in the $x_{11}$ direction. The transformation equations take the form:

$$x_{11} = \alpha(x_{21} - vt_2), \text{ where } t_2 \text{ is time measured in } S_2,$$

$$x_{12} = x_{22},$$

$$x_{13} = x^{23},$$

$$x_{14} = x_{24}, \text{ etc.}$$

and $$t_1 = \beta t_2 + \gamma x_{21} \qquad (3)$$

where $t_1$ is the time measured in $S_1$, and $\alpha$, $\beta$, and $\gamma$ are constant coefficients; that is, the first of Eqs.(3) simply states that a straight line in one system can be transformed into a straight line in the other system, but that the length of such a line along the $x_1$ axes measured in the two systems may differ. Imagine a spherical wave of radiation (for example, electromagnetic, gravitational, etc.) leaving the common point of origin at $t_2=0$ in one single universe (no "speed" through t space), traveling at a speed v=c in all directions. From the presumed invariance of c in all reference frames it follows that $$x_{11}^2 + x_{12}^2 + x_{13}^2 + x_{14}^2 + \ldots = c^2 t_1^2$$

and $$x_{21}^2 + x_{22}^2 + x_{23}^2 + x_{24}^2 + \ldots = c^2 t_2^2. \qquad (4)$$

Paraphrasing the discussion in R. M. L. Baker, Jr. (1967), pp. 210–211, Eq. (4) asserts that each observer (one at the origin of each coordinate system) will find at any instant of time that the shape of the wave front is a sphere with radius $ct_1$, in one case, and $ct_2$ in the other case, and that the center of the spheres will be at the respective coordinate system's center. Clearly, if we assume c is invariant, then something must give. That something is a difference in the measurement of lengths and times in the two systems and means that $\alpha$ and $\beta$ [in Eq. (3)] differs from unity and $\gamma$ differs from zero. Because we do not usually encounter speeds approaching that of light in our day-to-day experience, we seldom find circumstances in which the measurement of lengths and time is sensibly different in two frameworks. Nevertheless, at speeds near c such differences do occur and the analytical determination of $\alpha$, $\beta$, and $\gamma$ is simply a matter of algebra, as follows:

Substituting Eqs. (3) in the first of Eqs. (4) and collecting like coefficients and rearranging terms gives $$(c^2\beta^2 - v^2\alpha^2)t_2^2 = (\alpha^2 - c^2\gamma^2)x_{21}^2 + x_{22}^2 + x_{23}^2 + x_{24}^2 \ldots -2(v\alpha^2 + c^2\beta\gamma)x_{21}^2. \qquad (5)$$

Equating coefficients to those of the second of Eqs. (4), we find that $$c^2\beta^2 - v^2\alpha^2 = c^2$$

$$\alpha^2 - c^2\gamma^2 = 1$$

and $$v\alpha^2 + c^2\beta\gamma = 0 \text{ [zero for the lack of a coefficient in Eq. (4)]}. \qquad (6)$$

These three equations are then solved for the three unknowns: $\alpha$, $\beta$, and $\gamma$, that is, $$\alpha = \beta = 1/\sqrt{(1 - v^2/c^2)} \text{ and } \gamma = (-v/c^2)/\sqrt{(1 - v^2/c^2)} \qquad (7)$$

The well-known formula, $$\beta^2 = 1\sqrt{(1 - v^2/c^2)} \qquad (8)$$

proves that there is no departure from classical special relativity due to the use of the extended location-vector conventions in the spacetimeuniverse geometry.

Quantization, Probabilities, Uncertainties, and Quantum Jitters

One possible requirement (often mentioned by cosmologists) for a meaningful universe is that the laws of physics (as we know them) operate in the same way throughout a given universe. It is proposed that there is another overriding related requirement for a viable universe: that it be non-chaotic. That is, the prime requirement is that the laws of cause and effect operate in the larger scales (as opposed to the much smaller scales in which quantum jitters may introduce uncertainty in the cause-and-effect chain). Thus a viable universe would be non-chaotic, obey conservation laws, and exhibit forward-moving time in concert with ever increasing entropy.

One apparent peculiarity or uniqueness of our Universe is that the constants involved in the laws of physics that define it must have rather exact values or else our Universe would not be viable or at least would not lead to life as we know it. Following the concept of an infinite, continuous set of universes (multiuniverse concept), each universe could be imagined to be the result of a hypothetical random and continuous series of slot-machine "pulls". Most of the universes whose parameters were established by the imaginary slot machine wheels would show up as a set of "lemons" and others that are viable would show up with other combinations. The "jackpot" combination would be reserved for universes that can support life and, in particular, those that are essentially identical to ours. Of course, in our imaginary universe slot machines the wheels never quite come to rest due to quantum jitters. Thus we should find that the defining constants in all universes, including our own, although very precise, do vary with time in their ending significant figures.

The fact that energy assumes specific, discrete numerical values is experimentally very well established and is an absolute necessity in the physical world as we know it to operate. These discrete, quantitized values are only meaningful in a universe having definable dimensions (such as r and t), but that fact does not preclude inexactitude (probabilistic uncertainty) in the location position and time (velocity). This inexactitude is an uncertainty that is more profound than simply the fact that making and observation results in a change in the state of what is being observed. It is the fact that an entity only has a "probability" of occupying a given location in space and time and, in fact, the location can "vacillate" in smaller scales of the universe from one state or location to another i.e., "quantum jitters". The study of the concept of such vacillation in time will be an object of the use of the relatively large gravitational-energy flux produced by the invention as an example of the inventions use to study physical concepts.

Time Rate of Change of Angular Momentum Per Unit Time per Unit Area For Various Devices and Phenomenon (1) Spindle device spinning down or up The specific time-rate-of-change of angular momentum per unit time or time-rate-of-change of angular momentum per unit time per unit area [watts/m$^2$], is a measure of the local intensity of gravitational-wave production. Since the concept (to be tested) is that gravitational waves are propagated tangentially in the plane of the entity spinning down (or up), without diffraction the reference area is the thickness of this spinning entity times its circumference [m$^2$]. The radiation is similar to synchrotron-emitted photons propagated tangent to an electron's spiral or, more appropriately, a tangential crease in the spacetimeuniverse fabric analogous to that created in a cocktail napkin when twisted by a thumb. Let's consider an exemplar spindle device as described in this application. The device stores about 7.39 megawatts of electrical power, has a mass of 2.151×10$^6$ [kg], exhibits a 70 [m] radius, a 1.6 [m] thickness, rotates at 2.5 [radians/second] (23.9 rpm), with a radial acceleration of 44.5 g's (resisted by hoop-tension reinforcement in the rim), has a reference area=2π×70×1.6=7.04×10$^2$ [m$^2$], and comes to rest when the rim is caused to strike the water in the containment channel, in a few minutes to a fraction of a second (or one-hour of maximum power-generation by the IIPCS {motor-mode spin up is slower}). The moment of inertia of the exemplar spindle device is, with its mass concentrated on the rim, about I=Mr$^2$=(2.15×10$^6$) (70)$^2$=1.054×10$^{10}$ [kg-m$^2$], the angular momentum at the time of maximum energy storage is Iω=(1.054×10$^{10}$) (2.5)=2.63×10$^{10}$ [kg-m$^2$/sec] and if it essentially comes to rest in six minutes or 360 seconds, then the time-rate-of-change of angular momentum (in this and all subsequent examples the derivative of angular momentum is approximated by dividing by the spin-down time and linear spin down is assumed in order to compute order-of-magnitude results) is (2.63×10$^{10}$)/(360)=7.3×10$^7$ [kg-m$^2$/sec$^2$] or [Joules]. Over the spin-down time of 360 seconds the gravitational power is 7.3×10$^7$/360 [Joules/sec]=2.03×10$^5$ [watts]. The specific time-rate-of-change of angular momentum per unit time per unit area or gravitational-energy flux is 2.03×10$^5$/7.04×10$^2$= 288 [kg/sec$^3$] or [watts/m$^2$]. (Considering only the central section of the rim the peak gravitational-energy flux=520 [watts/m$^2$].)

(2) Hurricane dissipating

Assume a hurricane represented by three concentric annular disks whose thickness, t, are 18,000 [meters]. The innermost disk exhibits an inside radius of 25,000 [meters] and an outside radius of 75,000 meters (mean radius of 50,000 [meters]). The tangential component of wind speed for the entire disk is taken to be 50 [meters per second]. The angular speed is, therefore, 0.001 [radians/second]. The volume is 2.8×10$^{14}$ [cubic meters] and, assuming an air density, ρ, at the mean 9,000 [m] height to be 0.46 [kg per cubic meter], half the mass is 6.4×10$^{13}$ [kg] and the moment of inertia is 3.2×10$^{23}$ [kg-meter squared]. (I=½[ρ{πt(r$_{outer}^2$−r$_{inner}^2$)}]×[r$_{outer}^2$−r$_{inner}^2$].) The second concentric disk exhibits an inside radius of 75,000 [meters] and an outside radius of 125,000 [meters] (mean radius of 100,000 [meters]). The tangential component of wind speed for this entire disk is taken to the 25 [meters per sec]. The angular speed is, therefore, 0.000,25 [radians/second]. The volume is 5.6×10$^{14}$ [cubic meters] and half the mass is 1.3×10$^{14}$ [kg] and the moment of inertia is 1.3×10$^{24}$ [kg-meter squared]. The outermost, third disk exhibits an inside radius of 125,000 [meters] and an outside radius of 175,000 [meters] (mean radius of 150,000 [meters]). The tangential components of wind speed for this entire disk is taken to be 17 [meters per second]. The angular rate is, therefore, 0.000,097 [radians/second]. The volume is 8.5×10$^{14}$ [cubic meters] and half the mass is 2.0×10$^{14}$ [kg] and the moment of inertia is 3×10$^{24}$ [kg-meter squared]. The angular momentum, IΩ, for each of the three disks is about 3×10$^{20}$ [kg-meter squared/second], for a total angular momentum of about 9×10$^2$ [kg-meter squared/second]. We will also assume that the wind speed drops about 10 meters per second per day or, say, five days for the angular momentum of all three disks to vanish and the hurricane to dissipate. Thus, approximately, the time-rate-of-change of angular momentum equals Δ(Iω)/Δt=9×10$^{20}$/5$^d$×24$^h$×60$^m$×60$^s$=2×10$^{15}$ [kg-m$^2$/sec$^2$] or [Joules] or 2×10$^{15}$/(5$^d$) (24$^h$) (60$^m$) (60$^s$)=4.6×10$^9$ [watts]. The specific time-rate-of-change of angular momentum per unit time per unit area (reference area=2π×1.75×10$^5$×1.8×10$^4$=2×10$^{10}$ [square meters]) at the outmost edge is given by 4.6×10$^9$/2×10$^{10}$=0.23 [kg/sec$^3$] or [watts/m$^2$].

(3) Composite flywheel in a vacuum spinning down

Inferences from two informal writings of Charles E. Bakis of the Pennsylvania State University's Department of Science and Mechanics ("Batteries for the 21st century: Composite Flywheels", April 1998 and "Composite Flywheel Energy Storage," Aug. 21, 1998 to be found at http://www.esm.psu.edu/htmls/deptinfo/cmtc/flywheel.html) and from Richard Post and J. Ray Smith of the Lawrence Livermore National Laboratory (discussion of the electro-mechanical battery (EMB) to be found at http:www.llnl.gov/str/Fly.html) reveal the following: the composite flywheel's moment of inertia is about 0.01 [kg-m$^2$], it's rotational rate is about 68,000 rpm or 7.121×10$^3$ [radians/second] and it can spin down in as little as five minutes. If we assume the actual flywheel provides the reference area, then for a 0.154 m radius and a 3 cm thickness composite flywheel, the reference area is 0.03 [m$^2$]. The time-rate-of-change of angular momentum per unit time (assuming a linear spin down) is $(0.01)$ $(7.121 \times 10^3)/((5^m)$ $(60^s))^2 = 7.9 \times 10^{-4}$ [kg-$^2$/sec$^2$] or [watts]. The specific time-rate-of-change of angular momentum per unit time per unit area or gravitational-energy flux is $7.9 \times 10^{-4}/0.03 = 2.6 \times 10^{-2}$ [kg/sec$^3$] or [watts/m$^2$].

(4) Galaxy slowing

For our Galaxy, according to W. E. Forsythe (1956), *Smithsonian Physical Tables*, Smithsonian Institution, Washington D.C., p. 770, table 882, and pp.713, 729, and 739, the mass is about $3.27 \times 10^{41}$ [kg], it can be very roughly considered to have a "radius of gyration" (to our Sun) of about 9000 parsecs or $2.8 \times 10^{20}$ [m], rotates at about $10^{-15}$ [radians/sec] (varies radially, of course, and is here computed from $2\pi$ radians/({$200 \times 10^6$ year period}{365 days $\times$ $24^h \times 60^m \times 60^s$}) = $10^{-15}$ [rad/sec]), and has a reference area at our Sun (assume a 10% thickness) of $2\pi \times 2.8 \times 10^{20} \times 0.1 \times 2.8 \times 10^{20} = 4.9 \times 10^{40}$ [m$^2$]. The moment of inertia of our Galaxy is a very roughly $I = Mr^2 = (3.27 \times 10^{41})$ $(2.8 \times 10^{20}) = 2.6 \times 10^{82}$ [kg-m$^2$], so that the angular momentum is currently about $I\omega = (2.6 \times 10^{82})$ $(1 \times 10^{-15}) = 2.6 \times 10^{67}$ [kg-m$^2$/sec]. If one makes a huge assumption that intergalactic tidal forces and relativistic gravitational radiation will stop the rotation of our Galaxy in, say forty billion years, then the gravitational power would be $\Delta(I\omega)/(\Delta t)^2 = 2.6 \times 10^{67}/(4 \times 10^{10} \times 365^d 24^h \times 60^m \times 60^s)^2 = 1.63 \times 10^{31}$ [Joules/sec] or [watts]. The specific time-rate-of-change of angular momentum per unit time per unit area or gravitational-energy flux at the sun's distance is $1.634 \times 10^{31}/4.9 \times 10^{40} = 3.3 \times 10^{-10}$ [kg/sec$^3$] or [watts/m$^2$].

(5) Binary Pulsar PSR 1913+16 Coalescing

The binary pulsar PSR 1913+16 (a pair of neutron stars) will coalesce in $3.5 \times 10^8$ years due to gravitational radiation and produce a rather continuous gravitational wave until that time (actually, more of a "periodic wave," albeit not alternating, than continuous). According to Weisberg, J. M., Taylor, J. H. and Fowler, L. A. (1981), *Scientific American*, October, p. 74ff, the period of their mutual rotation is 7.75 hours (or $2.79 \times 10^4$ [sec]), periastron is 1.1 solar radii (one solar radius is $6.965 \times 10^8$ [m]) apastron is 4.8 solar radii. It's radius of gyration is essentially the semi-major axis=(1.1+4.8)/2=2.95 solar radii=(2.95) $(6.965 \times 10^8) = 2.05 \times 10^9$ [m]. The neutron stars exhibit a mass of about 1.4 solar masses so that together their mass is (2) (1.4) $(1.987 \times 10^{30}) = 5.56 \times 10^{30}$ [kg]. Thus the moment of inertia of the binary-pulsar system is approximately $(5.56 \times 10^{30})$ $(2.05 \times 10^9)^2 = 2.34 \times 10^{49}$ [kg-m$^2$]. The current angular rate of the system = $2\pi/2.79 \times 10^4 = 2.25 \times 10^{-4}$ [radians/sec]. Thus the moment of inertia of the system is currently, $I\omega = (2.34 \times 10^{49})$ $(2.25 \times 10^{-4}) = 5.27 \times 10^{45}$ [kg-m$^2$/sec]. If it essentially comes to rest (coalesces) in $(3.5 \times 10^8)$ $(365^d)$ $(24^h)$ $(60^m)$ $(60^s) = 1.104 \times 10^{16}$ [sec] (and all of the orbital angular momentum is assumed to have been dissipated), then the time-rate-of-change of angular momentum is $5.27 \times 10^{45}/1.104 \times 10^{16} = 4.77 \times 10^{29}$ [kg-m$^2$/sec$^2$] or [Joules]. Over the spin-down (coalescence) time of $1.104 \times 10^{16}$ [sec] the gravitational power is $4.77 \times 10^{29}/1.104 \times 10^{16} = 4.32 \times 10^{13}$ [Joules/sec] or [watts]. According to a perusal of binary-star catalogs by John Mosley of the Griffith Observatory, the binary pulsar PSR 1913+16 is at a distance from our Sun of 23,300 light years. At the Sun's distance (if the pulsar's orbit plane coincided with the ecliptic-it doesn't and is inclined about 45 degrees, unfortunately) the reference area is a circular ribbon or strip having a width of the diameter of a neutron star, $3 \times 10^4$ [m]. The reference area equals $(3 \times 10^4)$ $(2\pi)$ $(2.33 \times 10^5)$ $(9.5 \times 10^{15}$ meters per light year) = $4.17 \times 10^{26}$ [m$^2$]. Thus the specific time-rate-of-change of angular momentum per unit time per unit area or gravitational-energy flux is very roughly $4.32 \times 10^{13}/4.17 \times 10^{26} = 1.036 \times 10^{-13}$ [watts/m$^2$].

(6) Earth's slowing

For the Earth, according to R. M. L. Baker, Jr. and M. W. Makemson (1967), *An Introduction to Astrodynamics* second edition, Academic Press, New York, pp. 233–234, the mass is $5.98 \times 10^{24}$ [kg], it has a radius of 6,378,165 [m], exhibits a surface area of $5.1 \times 10^{14}$ [m$^2$] (actually the reference area is a smaller equatorial band, but this is a reasonable approximation), rotates at $72.9 \times 10^{-6}$ [radians/second], and slows down at about $2.2 \times 10^{-5}$ [seconds/year]. Thus if the rate were linear, then the Earth would essentially come to rest, showing always the same face to the Sun (like the Moon to the Earth) very approximately in about 365 d $\times$24 h$\times$60 m$\times$60 s/$2.2 \times 10^{-5} = 1.4 \times 10^{12}$ years (only in theory, since the Earth would probably no longer exist at this time). Thus it would come to "rest" (rotational period equal to orbital period) in $4.5 \times 10^{19}$ [sec]. The moment of inertia of the Earth about its polar axis is approximately I=0.33344 Mr$^2$ (see p. 739 of the *Smithsonian Physical Tables*, Ninth Revised Edition, 1956) or very roughly about (0.33) $(5.98 \times 10^{24}$ kg)(6,378,000 m)$^2 = 8.1 \times 10^{37}$ [kg-m$^2$]. Thus the angular momentum is $8.1 \times 10^{37} \times 72.9 \times 10^{-6} = 5.9 \times 10^{33}$ [kg-m$^2$]. The gravitational power is $5.9 \times 10^{33}/(4.4 \times 10^{19})^2 = 2.89 \times 10^{-6}$ [kg-m$^2$/sec$^3$] or [watts]. The specific time-rate-of-change of angular momentum per unit time per unit area or gravitational-energy flux is $(2.89 \times 10^{-6})/(5.1 \times 10^{14}) = 5.7 \times 10^{-21}$ [kg/sec$^3$] or [watts/m$^2$].

(7) Conclusion

Since the gravitational-wave intensity is strongly correlated to the gravitational-energy flux (that is, it is a useful measure of gravitational wave intensity), the local intensity of the continuous gravitational waves generated by the exemplar spindle device are considerably more intense than those created by a hurricane dissipating and coming to rest, a composite flywheel spinning down in a vacuum, our Galaxy slowing, binary pulsar PSR 1913+16 coalescing measured at Suns' distance, or the Earth slowing. obviously, a rapidly spinning down binary pulsar or a star undergoing asymmetrical expansion or. collapse could generate tremendously stronger gravitational waves locally, but clearly their environs would not be suitable for a practical experiment site and would not be capable of producing and controlling focused gravitational wave beams for propulsion or for communications.

Test of spacetimeuniverse Geometry and Time Reversal

An example of one of several tests of fundamental physical concepts afforded by the generation of intense gravitational waves by the present invention is as follows: Assuming an infinite, continuum of universes, there could be a vacillating or "tunneling" from one universe to another at small scales. It is to be emphasized that the test through application of the present invention, is of a natural-philosophical concept or conjecture not of a rigorous new physical theory. Since time reversal (as opposed to time advancement) violates the fundamental law of cause and effect, each time reversal must spawn a new universe that is nearly (due to quantum jitter) tangent (osculating) in all dimensions (r, t) at the time of the reversal. It is hypothesized that since the smaller particles have a more detailed structure, that is they may have higher dimensions, they are more fragile and susceptible to spacetimeuniverse geometry warp or tear caused by gravitational stress related to a large gravitational-energy flux. Thus smaller scale entities (possibly strings) would pop into existence (be created) in our current universe from a slightly future (nearly tangent or osculating) different universe or appear from the past in the current universe. Such smaller scale entities would vanish (disappear) into the past into a slightly earlier (nearly tangent or osculating) spawned universe or into future in the current universe. In this fashion the rule of cause and effect will not be violated.

It is anticipated that the warp of the spacetimeuniverse (a subset being the conventional spacetime continuum or geometry) geodesic created by the relatively strong— continuous as opposed to alternating gravitational waves, generated by the large gravitational-energy flux of the spindle device described in the application, will facilitate such a time reversal/advancement process. It is expected that through use of the spindle device (having a very massive, high-speed rim) the creation and disappearance of entities will occur at scales large enough to be detectable and will validate or invalidate the concept of the spacetimeuniverse geometry described herein.

Consider a hypothetical in which a sequence of events is represented by an imaginary horse race involving 1,000 thoroughbreds. All horses come out of the starting gate at the same instant of time and their progress (measured in our "nominal" universe) is followed thereafter in a statistical fashion. That is, although individual horses may change their relative position in the "pack" there will be a moving histogram of the distribution of the horses about some median point that moves along the track. Assuming no interaction among the horses and that their capabilities are randomly distributed, the moving histogram of relative horse location will be Gaussian or nearly so. Let us now warp the spacetimeuniverse geodesic by the continuous gravitational-energy flux created by the spindle device of the present invention spinning down. Let us suppose that in a random fashion 20 percent of the horses (200) are Time Travelers: 100 will travel to various future times in the same universe and 100 will travel back in time to a different, osculating universe (s). Assuming that the conservation of mass (energy) prevails and that entropy remains either the same or increases during the universe-to-universe, time-traveling events, an equal number of horses will appear on the track from the past of the same universe or from the future of an oscillating universe. Since the universes originating the replacement horses are either the same or tangent to the nominal universe of our race, those from the past will tend to appear behind in the pack (closer to the starting gate) and those from the future ahead in the pack (closer to the finish). Thus a statistical study of the race histograms with and without the intense gravitational-energy flux should reveal the percentage of the imaginary time-traveling horses and at what times they are "plucked" from the current and past universes. Several different real-physical-event proxies could be utilized for the imaginary horse race: dispersion of a light pulse, radioactive decay prompted by some triggering mechanism, dispersion of pulses of a particle beam, possibly even the single-electron capacity spectroscopy (see Zhitenev et al, *Science,* 285, pp. 715–718), etc. Statistical measures are utilized to test the concept in order to average out quantum jitters and allow for a "view" of the activity of the wave/particles on very small scales without actually "viewing" them as individuals. It will, of course, be important to analyze whether or not the "replacement horses" will in fact show up in different places along the pack histogram or whether they will simply fill-in the same positions as the original time-traveling horses that are "plucked" from or "squished" off the racetrack and, therefore, provide no useful information. An object of the present invention will be to determine whether or not such histograms and/or dispersion change with and without the presence of an intense continuous gravitational-energy flux as an example of the use of the invention in studying physical theories, concepts and conjecture.

Gravitational Wave Generation and its Utilization for Propulsion and Communication Another object of the present invention is to utilize the generated continuous gravitational waves, directed tangentially away from the rim during spin down, to impart positive momentum to objects in the rotational plane of the rim and likewise, to utilize the generated gravitational waves, directed tangentially towards the rim during spin up, to remove momentum from objects in the rotational plane of the flywheel's rim. It is hypothesized that during spin down momentum is dissipated to external systems whereas during spin up momentum is absorbed from external systems. An object of the present invention is to experimentally validate or invalidate this concept of momentum transfer at a distance utilizing continuous gravitational wave propagation by means of observing the motion of objects in the plane of the rim's rotation during spin up and spin down at the gravitational wave test facility.

The rim need not be completely and uniformly filled with ballast, but can be segmented in two or more opposing sections. Thus gravitational waves can be directed along angular, fan-like beams that result from the IIPCS being energized (either in the motor, spin-up or generator, spin-down mode) for brief time periods or pulses just as the opposing segmented rim sections pass over them. The opposing sections of the IIPCS will be intercepted by imaginary connecting lines in space. A preferred embodiment of the invention would be a dumbbell shaped permanent-magnet rim spindle shown in FIG. 8B. In this case the imaginary connecting line would be the axis of the dumbbell. Thus a fan-like gravitational wave beam could be generated tangential to opposite sides of the spindle each time the dumbbells pass over two opposite segments of the IIPCS, which are momentarily energized or "pulsed" during their passage.

Consider an array of several spindles in space, having coincident orbital planes (geocentric or helocentric) and planes perpendicular to their spin axes, that is, all planes coincide. The angles of the dumbbell axes, relative to some inertial direction in the common plane, would be offset from one another or phased at some epoch. Thus the gravitational-wave beam or fan pulses, produced by the momentary energizing of their respective IIPCS's during dumbbell passage, could be programmed to intersect or converge in space in the common plane at contiguous times. The several spindles in the array would work in concert to produce a quasi-continuous gravitational-wave beam focused at one point in space or on the earth. The composite gravitational wave beam would be anisotropic and have an effective "gain" and efficiently concentrate the available energy. By appropriately controlling the IIPCS's during the energized passes of the dumbbell; the gravitational wave could be modulated and shaped. Such a process would also lead to another objective of the invention; namely, communication with a gravitational-wave detector shown in FIG. 8A and FIG. 8B.

A preferred means to provide for an array of co-planar spindle rims would be to place them on orbit either geocentric or heliocentric and have the planes of the rims and the orbits coincide. In space, as an orbiting device, the segmented spindle-rim embodiment of the invention would transfer angular momentum to the IIPCS and power-supply and energy-storage assembly during spin down. Likewise during spin up angular momentum would be removed from the IIPCS and power-supply and energy-storage assembly. The net angular momentum of the spindle-IIPCS assembly pair (orbiting device) would be zero. The IIPCS assembly would produce an unfocused, isotropic gravitational wave and not a focused, fan-like beam and, no doubt, the IIPCS together with its power supply and energy storage components, would have a much larger reference area than the segmented, dumbbell spindle. Thus the oppositely directed IIPCS-assembly produced gravitational waves would be of far less intensity than those produced by the dumbbell rim. The oppositely directed IIPCS-assembly produced gravitational waves would, therefore, not negate or cancel a focused beam generated by the periodically pulsed deceleration (spin down) or acceleration (spin up) of the dumbbell rim itself. In space, there is no need to have a physical connection between the spindle-dumbbell element and the IIPCS power supply/storage element of the orbiting device. Their common rotational axes is kept in alignment by means of the IIPCS acting on the permanent magnets in the rim in a manner analogous to the IIPCS dynamic balancing previously referred to herein.

Using the present invention, practitioners of average skill in the art will be able to fabricate and deploy a system of spindle/IIPCS devices in space and utilize the gravitational wave energy produced thereby to achieve spacecraft propulsion. Thus a spacecraft could be launched (given positive momentum during spin down of the array members) like a catapult or retrieved (momentum removed during spin up of the array members) as the spacecraft moves in the common spindle/orbit plane. The focused, convergent continuous gravitational-wave beams thereby provide propulsion for spacecraft in the Solar System. Alternatively, propulsion is provided for by anisotropic, continuous (not alternating) gravitational-wave emission by means of incorporating the spindle/IIPCS device or devices onboard the spacecraft and damping out or otherwise, absorbing, attenuating, reflecting or deflecting the opposing leg of the radiation pattern 51 in FIG. 8B. Attenuation, for example, is accomplished by superimposing a frequency on the generated gravitational waves (modulation) that conform to the resonance frequency of molecules or atoms in an intervening material on board the spacecraft. Absorption, for example, is accomplished by means of intervening high-density matter carried on board the spacecraft.

What is claimed is:

1. An energy storage device comprising:
   a rotatable flywheel having a rim spaced a predetermined distance from the center of the flywheel;
   a support structure for the flywheel;
   a series of permanent magnets located at spaced intervals along the periphery of the rim;
   a series of coils disposed at spaced intervals adjacent the rim in operative electromagnetic field relationship with the magnets;
   a power source for supplying electrical energy to the coils to cause the flywheel to rotate up to a predetermined speeds;
   a power take-off for receiving electric energy from the coils as the flywheel rotation diminishes;
   computer control means operatively connected to the power source and power take-off for selectively connecting the coils in series and parallel circuit relationships, and in coils of different length in response to operation of the device in an electric generator, electric motor, free-wheeling, rotational rate modulating or dynamically balancing configuration.

2. A device according to claim 1 wherein the flywheel has a rotatable hub floatably disposed in a receptacle or basin of a predetermined diameter and depth.

3. A device according to claim 2 wherein the rim is spaced a substantial distance from the hub and has a substantial mass.

4. A device according to claim 3 wherein the flywheel support structure is mounted on the hub whose rotational axis is held to the vertical by radial bearings disposed at its top and bottom in order to resist gyroscopic and wind and sand-storm and earthquake side forces, and extends between the hub and the rim for supporting the weight in the rim.

5. An energy storage device according to claim 4 including a containment barrier located exteriorly of and surrounding the rim to shield the rim from wind and sand storms.

6. An energy storage device according to claim 5 including a channel located beneath the rim and interiorly of the barrier for receiving a charge of liquid to stop the rotation of the rim and to generate high-intensity gravitational waves.

7. A device according to claim 6 including gravitational-wave detector situated externally to and in the plane of the rim.

8. A device according to claim 7 wherein the receptacle or basin and hub comprise a fluid bearing.

9. A device according to claim 1 wherein the permanent magnets are oriented with poles facing downwardly.

10. A device according to claim 1 wherein the permanent magnets are oriented with their poles facing radially.

11. A device according to claim 1 wherein the series of coils comprise a plurality of spaced coil sets.

12. A device according to claim 11 wherein each of the coils in the coil sets are comprised of a plurality of turns.

13. A device according to claim 9 wherein the coil sets are located below the permanent magnets.

14. A device according to claim 10 wherein the coil sets are located in opposed facing relationships to the permanent magnets.

15. A device according to claim 8 wherein the receptacle or basin is filled with a liquid of a predetermined viscosity and density.

16. A device according to claim 15 including a splash guard or lip attached to the inside top edge of the receptacle or basin.

17. A device according to claim 15 including a float valve for selectively controlling the replenishment of liquid lost from the receptacle or basin.

18. A device according to claim 15 wherein the center of buoyancy of the hub is located above the center of gravity of the device.

19. A device according to claim 4 wherein the rim support structure is a plurality of struts and guy wires interconnecting the hub and rim in a balanced weight supporting structure.

20. A device according to claim 8 wherein the hub is supported in the receptacle or basis by a low friction bearing.

21. A device according to claim 20 wherein the bearing is an air bearing.

22. A device according to claim 20 wherein the bearing is a magnetic bearing.

23. A device according to claim 4 wherein radial bearings are disposed at the top and bottom of the hub along the rotational axes of the hub, the upper radial bearing being supported by guy wires to points on the ground and the lower radial bearing being attached to the bottom of the receptacle or basin.

24. A device according to claim 15 wherein the liquid is salt water.

25. An energy storage device according to claim 20 wherein a plurality of vertically oriented airfoils are located at spaced intervals around the circumference of the flywheel for producing rotation of the flywheel by wind power.

26. A device according to claim 25 wherein the airfoils are rigid and pivotally mounted at their base to tilt when wind velocities of a predetermined threshold are encountered.

27. A device according to claim 26 wherein the pivot axis is oriented such that the rigid airfoils tilt away from the hub exteriorly of the rim.

28. A device according to claim 25 wherein the airfoils are semi-rigid and flex when wind velocities of a predetermined threshold are encountered.

29. A device according to claim 28 wherein the axis of flex curvature is directed such that the semi-rigid airfoil tilts away from the hub exteriorly of the rim.

30. A device according to claim 1 wherein the computer control means comprise a central computer and a plurality of power transistors operatively connected between the computer and the spaced coils sets.

31. A device according to claim 30 wherein the computer and the power transistors are operated to continuously vary the effective length of the coils in each coil set.

32. A device according to claim 30 wherein the computer and power transistors are operated to connect the coil sets in series circuit relationship in response to predetermined device operations.

33. A device according to claim 30 wherein the computer and power transistors are operated to connect the coil sets in parallel circuit relationship in response to predetermined device operations.

34. A device according to claim 30 wherein the computer and power transistors are operated to connect the coil sets in partial parallel circuit relationship and in partial series circuit relationship to maintain precise output voltage control.

35. A device according to claim 30 wherein the computer and power transistors are operated to connect the coil sets dynamically to lead or to lag permanent magnets located on the periphery of the moving rim.

36. A device according to claim 30 wherein the coils include metallic cores.

37. A device according to claim 35 including means for modulating the gravitational waves.

38. A device according to claim 37 including means for modulating the gravitational waves.

39. A device according to claim 38 including detectors for receiving the modulated gravitational waves.

40. A device according to claim 39 wherein the rim is segmented into two or more opposing sections.

41. A device according to claim 40 including means for forming gravitational waves into anisotropic beams.

42. A device according to claim 41 wherein the device is utilized as a gravitational-wave generator for propulsion of spacecraft.

43. An energy storage device comprising:
   a rotatable mass;
   a plurality of magnets located at spaced intervals around the periphery of the mass;
   a plurality of conductive wire coils located at spaced intervals adjacent the mass in operative electromagnetic field relationship with the magnets;
   an electric power source for supplying electrical energy to the coils and;
   computer control means operatively connected to the power source for selectively connecting the coils in instantaneously selective circuit relationships and coil lengths to operate the device in a motor configuration to cause the mass to rotate at a predetermined speed and thereby store mechanical energy for delivery of energy at a future time interval or for the generation of modulated gravitational waves.

44. An energy supply device comprising:
   a rotatable mass rotating at a predetermined speed of rotation;
   a plurality of magnets located at spaced intervals around the periphery of the mass;
   a plurality of conductive wire coils located at spaced intervals adjacent the mass in operative electromagnetic field relationship with the magnets;
   an electric power take-off for receiving electrical energy from the coils;
   a plurality of airfoils spaced around the periphery of the mass for receiving energy directly from the wind; and
   a computer control means operatively connected to the power take-off for selectively connecting the coils in instantaneously selective circuit relationships and coil lengths to operate the device in a generator configuration to receive energy from the rotating mass and thereby convert mechanical energy stored in the rotating mass into electrical energy to deliver the electrical energy to the power take-off.

* * * * *